US012363669B2

United States Patent
Wang et al.

(10) Patent No.: US 12,363,669 B2
(45) Date of Patent: *Jul. 15, 2025

(54) TRAFFIC STEERING AND SWITCHING BETWEEN MULTIPLE ACCESS NETWORKS

(71) Applicant: InterDigital Patent Holdings, Inc., Wilmington, DE (US)

(72) Inventors: Guanzhou Wang, Brossard (CA); Saad Ahmad, Montreal (CA); Khalid Anwar, Montreal (CA); Behrouz Aghili, Commack, NY (US); Ulises Olvera-Hernandez, Saint-Lazare (CA); Mahmoud Watfa, Saint Leonard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,831

(22) Filed: Feb. 29, 2024

(65) Prior Publication Data

US 2024/0205861 A1   Jun. 20, 2024

Related U.S. Application Data

(63) Continuation of application No. 16/636,399, filed as application No. PCT/US2018/046231 on Aug. 10, 2018, now Pat. No. 11,950,198.

(Continued)

(51) Int. Cl.
*H04W 88/06* (2009.01)
*H04W 48/18* (2009.01)
(Continued)

(52) U.S. Cl.
CPC ......... *H04W 60/005* (2013.01); *H04W 48/18* (2013.01); *H04W 76/16* (2018.02)

(58) Field of Classification Search
CPC ... H04W 60/005; H04W 48/18; H04W 76/16; H04W 88/06; H04W 72/1215; H04W 76/11
See application file for complete search history.

(56) References Cited

U.S. PATENT DOCUMENTS 8,619,757 B2 * 12/2013 Shaheen ................. H04L 51/58
370/352
8,886,164 B2   11/2014 Palanigounder et al.
(Continued)

FOREIGN PATENT DOCUMENTS

CN   101577931 A   11/2009
CN   106953713 A   7/2017
(Continued)

OTHER PUBLICATIONS

3GPP TR 23.799 V1.2.0, "3rd Generation Partnership Project (3GPP)", Technical Specification Group Services and System Aspects, Study on Architecture for Next Generation System (Release 14), Nov. 2016, 548 pages.

(Continued)

*Primary Examiner* — Atique Ahmed
(74) *Attorney, Agent, or Firm* — Condo Roccia Koptiw LLP

(57) ABSTRACT

A WTRU may initiate access for a PDU session over multiple access networks. The WTRU may register with two or more access networks. For example, the WTRU may register with a 3GPP access network (e.g., LTE Advanced) and a non-3GPP access network (e.g., Wi-Fi). The WTRU may determine to request a multi-access PDU session for a (e.g., at least one) PDU session. A multi-access PDU session may correspond to a PDU session where the WTRU communicates one or more PDUs associated with the PDU session over the 3GPP access network and one or more PDUs associated with the PDU session over the non-3GPP (Continued)

access network. The WTRU may receive a confirmation message indicating that a multi-access PDU session has been established. The WTRU may send uplink data over the 3GPP access network and the non-3GPP access network, e.g., in accordance with the established multi-access PDU session.

20 Claims, 22 Drawing Sheets

Related U.S. Application Data

(60) Provisional application No. 62/587,639, filed on Nov. 17, 2017, provisional application No. 62/571,500, filed on Oct. 12, 2017, provisional application No. 62/544,122, filed on Aug. 11, 2017.

(51) Int. Cl.
 *H04W 60/00* (2009.01)
 *H04W 76/16* (2018.01)

(56) References Cited

U.S. PATENT DOCUMENTS

| | | | |
|---|---|---|---|
| 2008/0192925 A1 | 8/2008 | Sachs et al. | |
| 2010/0097977 A1 | 4/2010 | Rommer et al. | |
| 2013/0016696 A1* | 1/2013 | Adjakple | H04W 72/542 370/328 |
| 2013/0030687 A1 | 1/2013 | Shida | |
| 2014/0355507 A1 | 12/2014 | Amerga et al. | |
| 2016/0008791 A1 | 1/2016 | Schunk et al. | |
| 2016/0087913 A1 | 3/2016 | Wang et al. | |
| 2016/0088542 A1 | 3/2016 | Belghoul et al. | |
| 2017/0195930 A1* | 7/2017 | Tomici | H04W 12/08 |
| 2017/0201902 A1 | 7/2017 | Chen et al. | |
| 2017/0289898 A1 | 10/2017 | Youn et al. | |
| 2017/0332421 A1 | 11/2017 | Sternberg et al. | |
| 2018/0183855 A1* | 6/2018 | Sabella | H04L 67/04 |
| 2018/0279400 A1* | 9/2018 | Faccin | H04W 68/005 |
| 2018/0302935 A1 | 10/2018 | Kawasaki et al. | |
| 2018/0324577 A1* | 11/2018 | Faccin | H04W 36/0079 |
| 2018/0324826 A1* | 11/2018 | Iskander | H04W 76/27 |
| 2018/0352483 A1* | 12/2018 | Youn | H04L 63/0272 |
| 2018/0376446 A1* | 12/2018 | Youn | H04W 68/005 |
| 2019/0182895 A1 | 6/2019 | Di Girolamo et al. | |
| 2019/0230722 A1 | 7/2019 | Kawasaki et al. | |
| 2019/0274178 A1* | 9/2019 | Salkintzis | H04W 76/16 |
| 2019/0394745 A1 | 12/2019 | Yu | |
| 2020/0015128 A1 | 1/2020 | Stojanovski et al. | |
| 2020/0236727 A1 | 7/2020 | Salkintzis | |
| 2020/0267753 A1 | 8/2020 | Adjakple et al. | |
| 2020/0337095 A1 | 10/2020 | Kawasaki et al. | |

FOREIGN PATENT DOCUMENTS

| | | |
|---|---|---|
| EP | 2095595 A1 | 9/2009 |
| EP | 2495927 A1 | 9/2012 |
| WO | 2010054560 A1 | 5/2010 |
| WO | 2013010005 A1 | 1/2013 |
| WO | 2015200326 A1 | 12/2015 |
| WO | 2016190369 A1 | 12/2016 |
| WO | 2017123938 A1 | 7/2017 |

OTHER PUBLICATIONS

Ford, et al., "RFC 6824—TCP Extensions for Multipath Operation with Multiple Addresses", Internet Engineering Task Force (IETF), ISSN: 2010-1721, Jan. 1, 2013, 64 pages.
Huawei, et al., "New SID Study on the Wireless and Wireline Convergence Enhancement for the 5G system architecture", S2-172164 (revision of S2-xxxx), SA WG2 Meeting #120, Busan, South Korea, Mar. 27-31, 2017, 4 pages.
LG Electronics, "Clarification and evaluation about solution 4.20 (Session Management on the PDU session(s) via different accesses)", S2-166549 (revision of S2-165597), SA WG2 Meeting #118, Reno, Nevada, USA, Nov. 14-18, 2016, 5 pages.
LG Electronics, "Clarification and evaluation about solution 4.20 (Session Management on the PDU session(s) via different accesses)", S2-165597 (revision of S2-16xxxx), SA WG2 Meeting #117, Kaohsiung City, Taiwan, Oct. 17-21, 2016, 5 pages.
Li, Baoxing, "Novelty of 5G—The Brand-new Core Net", Telecom Word, No. 13, Jul. 12, 2017, 3 pages.
Naik, Kshirasagar et al., "Testing Communication Protocols", Concordia University, Montreal; Bilkent University, Ankara, 1992, 12 pages.
S2-167190, "Interim Agreements on Multiple PDU Sessions via Different Accesses", LG Electronics, SA WG2 Meeting #118, Reno, Nevada, USA, Nov. 14-18, 2016, 1 page.
S2-167190, "Interim Agreements on Multiple PDU Sessions via Different Accesses", LG Electronics, SA WG2 Meeting #118, Reno, Nevada, USA, Nov. 14-18, 2016, 2 pages.
S2-1701038, "TS23.502: Clarifications on Registration, PDU Session Establishment Procedures and Network Slicing", Huawei, HiSilicon, 3GPP TSG SA WG2 Meeting #119, Dubrovnik, Feb. 13-17, 2017, pp. 1-6.
S2-171902, "23.501: Proposal for PDU Session Management", Samsung Elec., SA WG2 Meeting #120, Busan, South Korea, Mar. 27-31, 2017, pp. 1-3.
S2-174443, "TS 23.501: Network Selection of Slices Requested by UE for Prioritization and Co-Existence", Qualcomm Incorporated, LG Electronics, SA WG2 Meeting #S2-122, San Jose Del Cabo, Mexico, Jun. 26-30, 2017, pp. 1-8.
S2-174609, "TS 23.501: P-CR to update 5.15 Network Slicing for non-3GPP access", SA WG2 Meeting #122; ETRI; San Jose Del Cabo, Jun. 26-30, 2017, 3 pages.
S2-180449, "UE Requested Multi-Access PDU Session Establishment", InterDigital Inc., SA WG2 Meeting #125, Gothenburg, Sweden, Jan. 22-26, 2018, 4 pages.
TR 24.890 V0.2.0, "3rd Generation Partnership Project (3GPP)", Technical Specification Group Core Network and Terminals, 5G System—Phase 1, CT WG1 Aspects (Release 15), May 2017, pp. 1-70.
TS 23.161 V14.0.0, "3rd Generation Partnership Project (3GPP)", Technical Specification Group Services and System Aspects, Network-Based IP Flow Mobility (NBIFOM), Stage 2 (Release 14), Mar. 2017, pp. 1-67.
TS 23.401 V14.4.0, "3rd Generation Partnership Project (3GPP)", Technical Specification Group Services and System Aspects, General Packet Radio Service (GPRS) Enhancements for Evolved Universal Terrestrial Radio Access Network (E-UTRAN) Access (Release 14), Jun. 2017, pp. 1-386.
TS 23.402 V14.2.0, "3rd Generation Partnership Project (3GPP)", Technical Specification Group Services and System Aspects, Architecture Enhancements for Non-3GPP Accesses, (Release 14), Dec. 2016, pp. 1-307.
TS 23.501 V1.1.0, "3rd Generation Partnership Project (3GPP)", Technical Specification Group Services and System Aspects, System Architecture for the 5G System, Stage 2, (Release 15), Jul. 2017, pp. 1-165.
TS 23.501 V1.2.0, "3rd Generation Partnership Project (3GPP)", Technical Specification Group Services and System Aspects, System Architecture for the 5G System, Stage 2 (Release 15), Jul. 2017, pp. 1-166.
TS 23.502 V0.4.0, "3rd Generation Partnership Project (3GPP)", Technical Specification Group Services and System Aspects, Procedures for the 5G System, Stage 2 (Release 15), May 2017, pp. 1-126.
TS 23.502 V0.5.0, "3rd Generation Partnership Project (3GPP)", Technical Specification Group Services and System Aspects, Procedures for the 5G System, Stage 2, (Release 15), Jul. 2017, pp. 1-148.
3GPP TR 23.799 V14.0.0, "3rd Generation Partnership Project (3GPP)", Technical Specification Group Services and System Aspects,

(56) References Cited

OTHER PUBLICATIONS

Study on Architecture for Next Generation System (Release 14), Dec. 2016, 525 pages.

* cited by examiner

TRAFFIC STEERING AND SWITCHING BETWEEN MULTIPLE ACCESS NETWORKS

CROSS-REFERENCE TO RELATED APPLICATIONS

This application is a continuation of U.S. patent application Ser. No. 16/636,399 (now U.S. Pat. No. 11,950,198), which is the National Stage Entry under 35 U.S.C. § 371 of Patent Cooperation Treaty Application No. PCT/US2018/046231, filed Aug. 10, 2018, which claims the benefit of U.S. Provisional Application Ser. No. 62/544,122, filed Aug. 11, 2017, U.S. Provisional Application Ser. No. 62/571,500, filed Oct. 12, 2017, and U.S. Provisional Application Ser. No. 62/587,639, filed Nov. 17, 2017, the contents of each of which are incorporated by reference herein in their entireties.

BACKGROUND

Wireless communication systems continue to evolve. A new fifth generation may be referred to as 5G. An example of a previous generation of mobile communication system may be referred to as fourth (4G) long term evolution (LTE).

SUMMARY

Systems, methods, and instrumentalities are disclosed for traffic steering and/or switching between multiple access networks, for example to be implemented in a 5G network. A wireless transmit/receive unit (WTRU) and/or one or more network entities may be configured to establish a (e.g., single) protocol data unit (PDU) session over multiple access networks. A WTRU accessing a network via multiple radio access networks may be referred to as multiple accesses. For example, a single-access PDU session may be extended to multiple-access PDU sessions. For example, a multi-access PDU session may be modified to a single-access PDU session. A network entity may provision access traffic steering policies to a WTRU and/or the WTRU may determine how to use or implement the traffic steering policies. The steering policies may be based on one or more of filters such as single-network slice selection assistance information (S-NSSAI), data network name (DNN), or quality of service (QOS). One or more examples of how a WTRU may use the policies for traffic steering and/or how the steering policies may interact with other policies such as network slice selection policy (NSSP) and WTRU route selection policies (URSP) may be provided. One or more network entities may implement access network specific network slicing (NS) and/or the NS selection for 3rd Generation Partnership Project (3GPP) access and non-3GPP access, e.g., at the same time. A WTRU may use access-specific QoS rule to determine an uplink (UL) QoS flow identity (QFI) over one or more different access networks. Non-3GPP interworking function (N3IWF) may enforce the reflective QoS for the WTRU when the non-3GPP access network does not support the reflective QoS.

A WTRU may initiate access for a PDU session over multiple access networks. The WTRU may register with two or more access networks. For example, the WTRU may register with a 3GPP access network (e.g., LTE Advanced) and a non-3GPP access network (e.g., Wi-Fi). The access networks may be associated with a single public land mobile network (PLMN). The WTRU may determine whether using multiple access networks is allowed for the PDU session, for example, based on an indication in a network slice selection assistance information (NSSAI) associated with the PDU session. The WTRU may determine to request a multi-access PDU session for a (e.g., at least one) PDU session. A multi-access PDU session may correspond to a PDU session where the WTRU communicates one or more PDUs associated with the PDU session over the 3GPP access network and one or more PDUs associated with the PDU session over the non-3GPP access network. The WTRU may determine to request a multi-access PDU session based on the WTRU being registered over two or more access networks. The WTRU may determine to request a multi-access PDU session based on one or more configured policies in the WTRU indicating that multi-access is preferred. The WTRU may determine to request a multi-access PDU session based on a network slice associated with the PDU session supporting multi-access PDU sessions.

The WTRU may send a request to an Access and Mobility Management Function (AMF). For example, the WTRU may send an explicit indication that the WTRU is requesting a multi-access PDU session. The request may be a PDU session ID for the PDU session. The WTRU may receive a confirmation message indicating that a multi-access PDU session has been established. For example, the confirmation may be received in duplicate (e.g., over both the 3GPP access network and the non-3GPP access network). The WTRU may send uplink data over the 3GPP access network and the non-3GPP access network, e.g., in accordance with the established multi-access PDU session.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
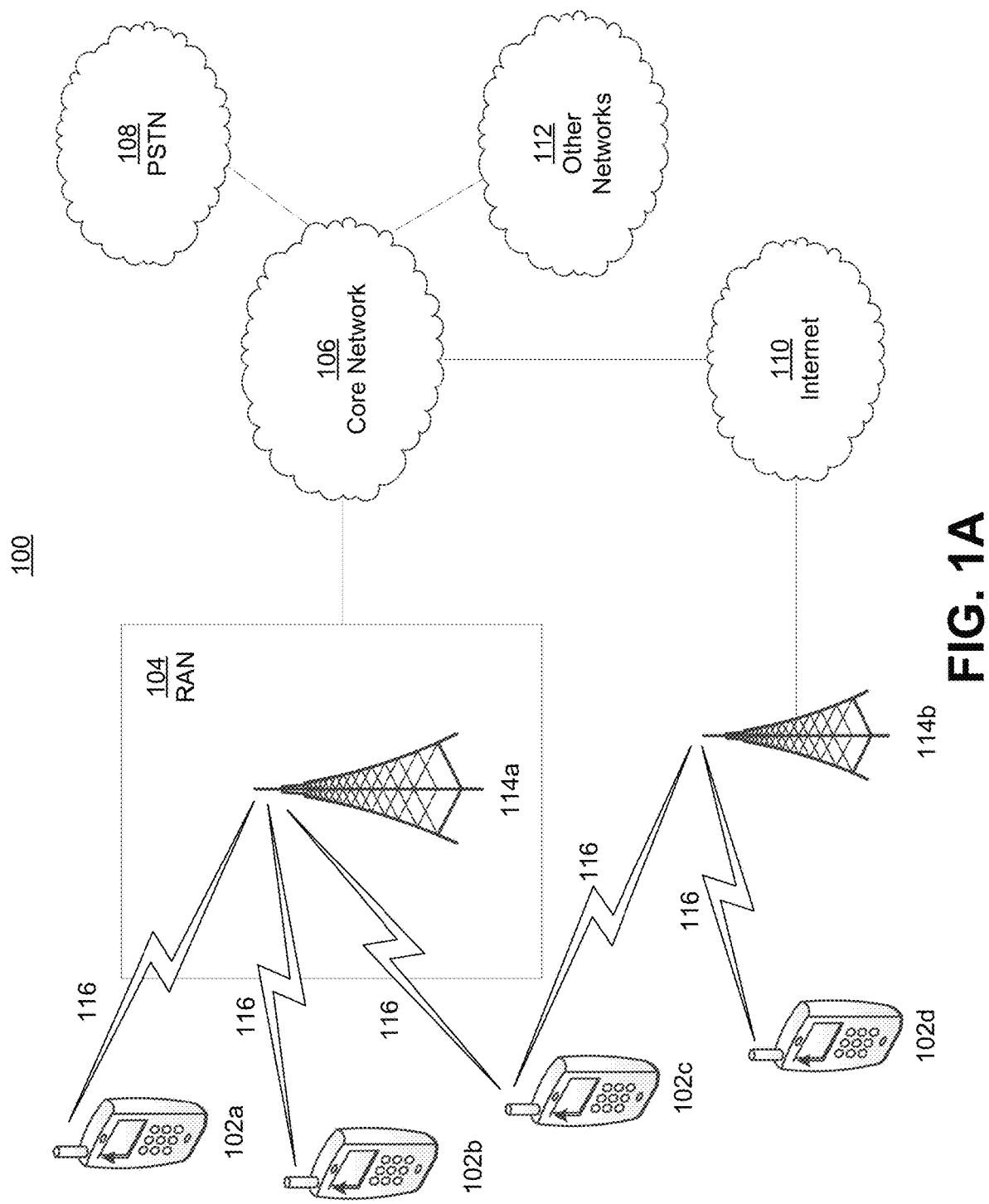
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
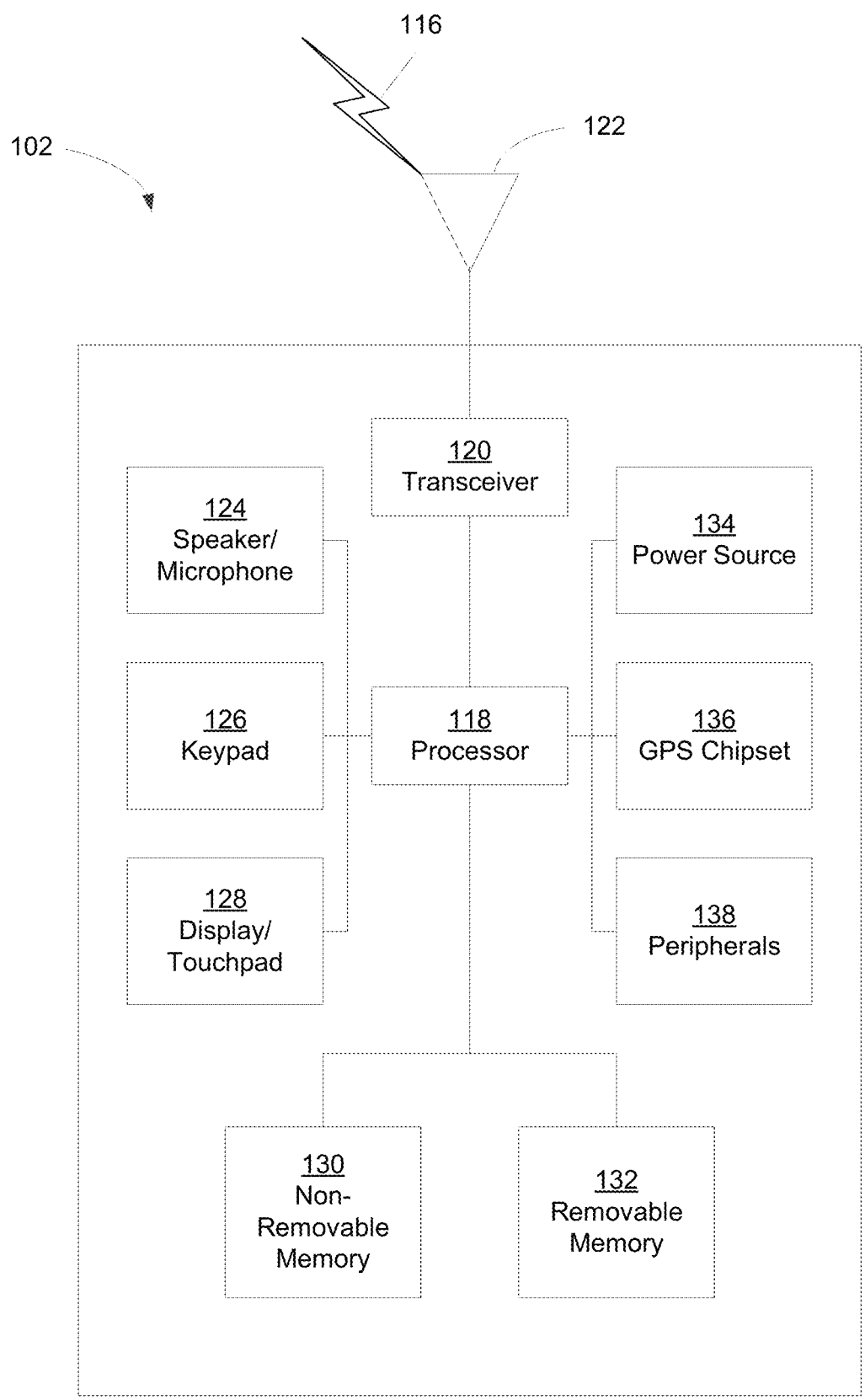
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
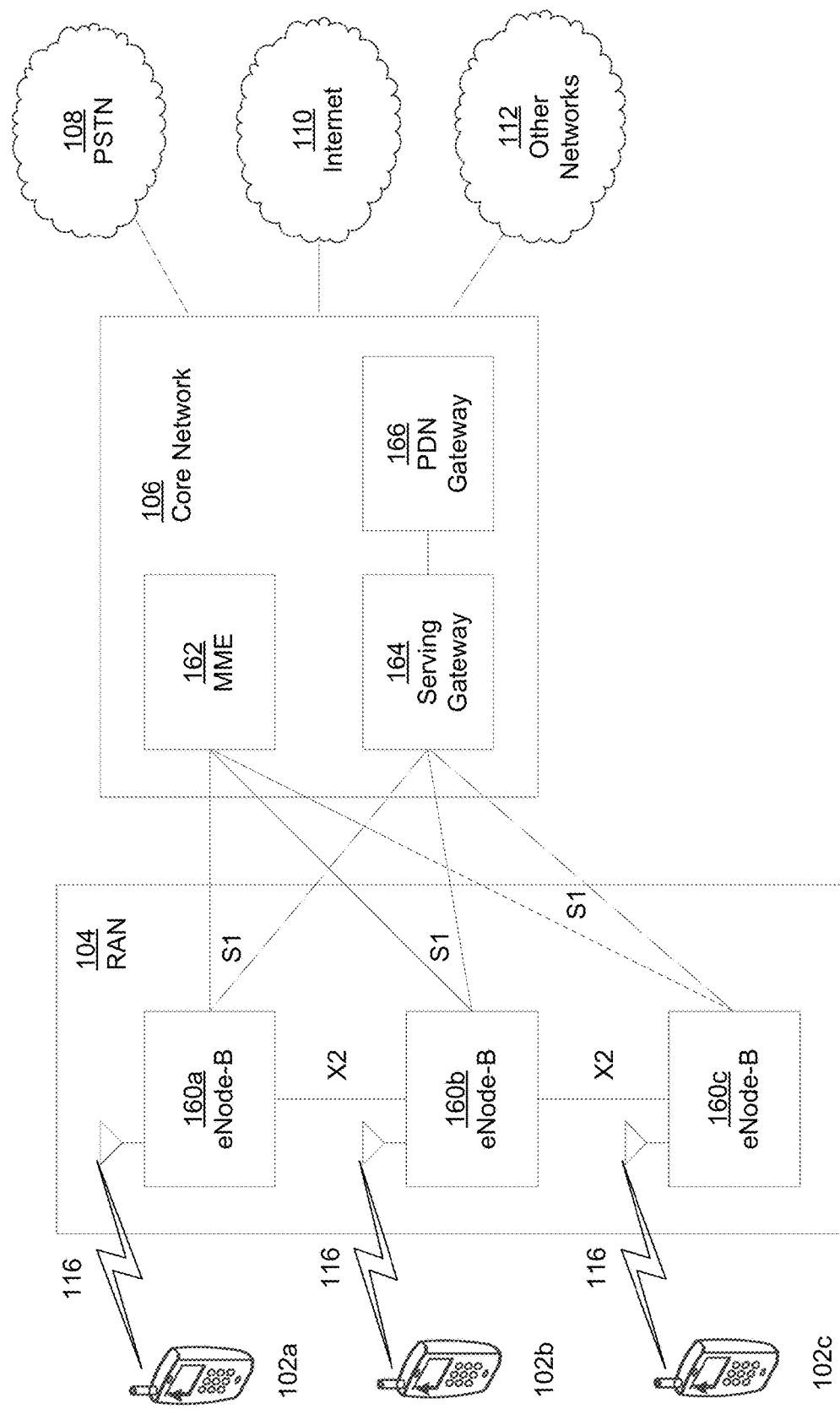
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHz, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
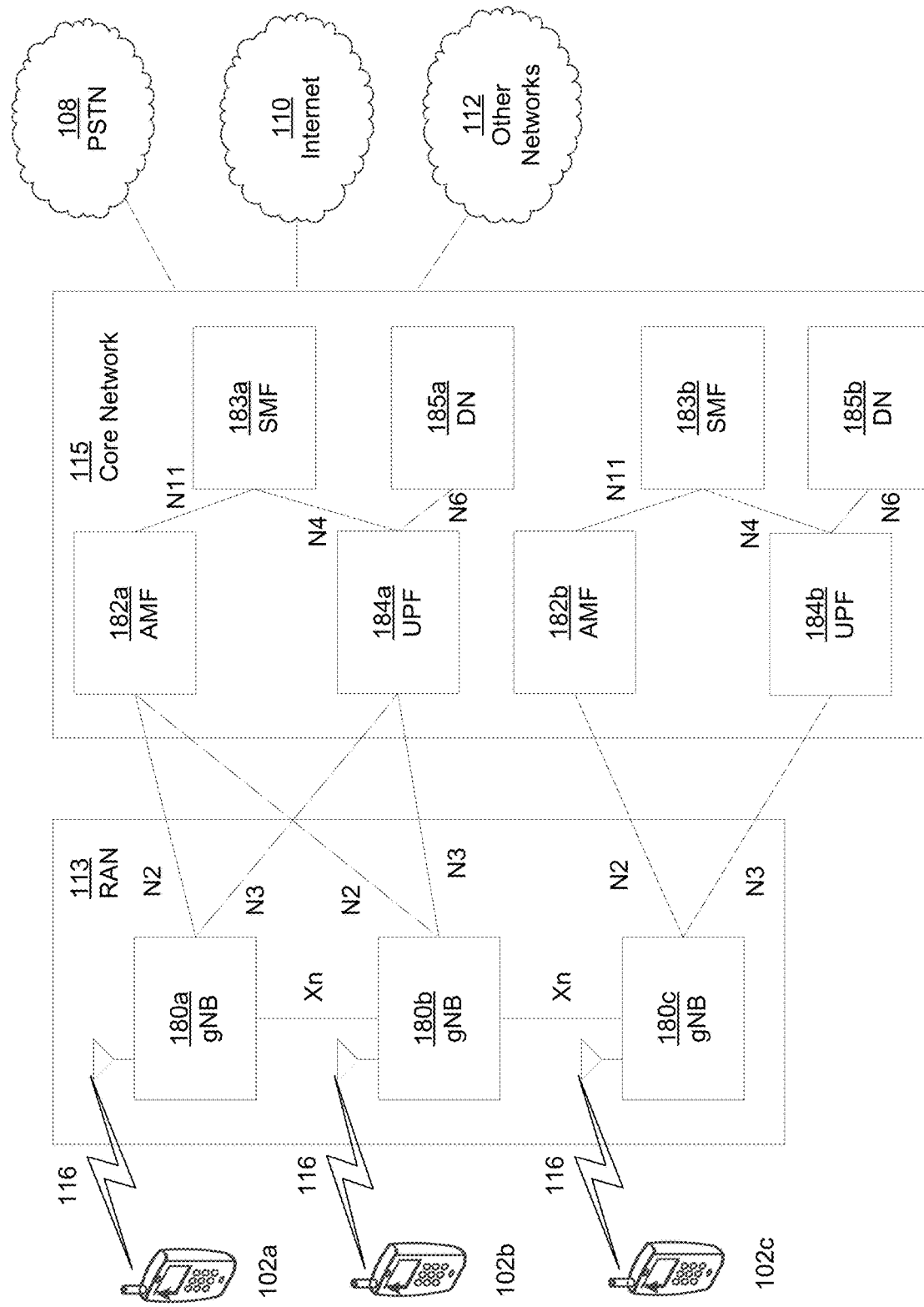
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Non-3rd Generation Partnership Project (non-3GPP) access network in a 5G system may be described herein. A system architecture, e.g., for a 5G communication system, may be configured to support a non-3GPP access network. A control plane may be established for controlling aspects related to untrusted non-3GPP access. A user plane may be established for untrusted non-3GPP access. A WTRU may perform registration via non-3GPP access. A WTRU may perform a service request via untrusted non-3GPP access. A WTRU may perform a WTRU requested PDU session establishment via untrusted non-3GPP access.

Figure 2:
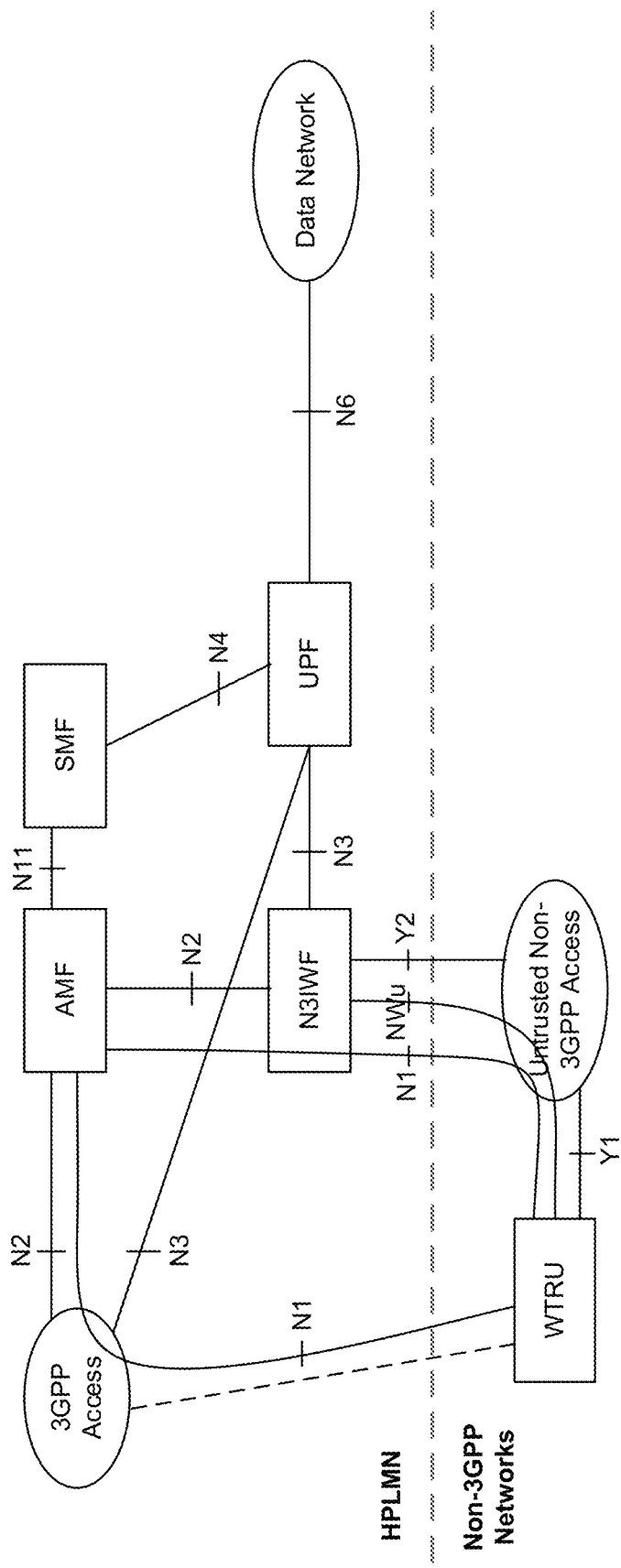
FIG. 2 illustrates an example non-roaming architecture for 5G Core Network with non-3rd Generation Partnership Project (non-3GPP).

A system architecture, for example for a 5G communication system, may be configured to support non-3GPP access networks. FIG. 2 illustrates an example non-roaming architecture for 5G Core Network with non-3GPP access. The system architecture may be configured to support untrusted non-3GPP access networks. For example, untrusted non-3GPP access networks may be connected to the 5G core (5GC) Network via Non-3GPP InterWorking Function (N3IWF). The N3IWF may interface to 5G Core Network control-plane and user-plane functions via N2 interface and N3 interfaces respectively. The functionalities of the N3IWF functions may include one or more of the following. A WTRU may establish an IPsec tunnel with the N3IWF. For example, a WTRU may establish an IPsec tunnel with the N3IWF to attach to the 5GC network over untrusted non-3GPP access. The IPsec tunnel establishment may be performed using the internet key exchange protocol version 2 (IKEv2) protocol. The N3IWF may act as a relay for NAS signaling between the WTRU and the AMF, which may happen via the N1 interface. Uplink traffic between the WTRU and the UPF may be relayed. Capsulation and/or decapsulation of traffic between the IPsec and the N3 tunnel may be performed. Quality of service (QOS) may be enforced according to N3 packet marking and/or QoS marking in the uplink (UL) packets. The AMF selection during attachment of the WTRU via non-3GPP access network may be involved.

A WTRU may be connected (e.g., simultaneously) to the 5GC Network of a public land mobile network (PLMN) over 3GPP and non-3GPP access networks. 3GPP access and non-3GPP access may be served by an (e.g., single) AMF if the selected N3IWF is located in the same PLMN as the 3GPP access. If the selected N3IWF is located in a different PLMN, the WTRU may be served by two or more separate PLMNs (e.g., two separate PLMNs) and may have two or more separate AMFs (e.g., two separate AMFs). Multiple N1 instances may exist for the WTRU when the WTRU is connected to multiple access networks (e.g., one for each access network).

Figure 3:
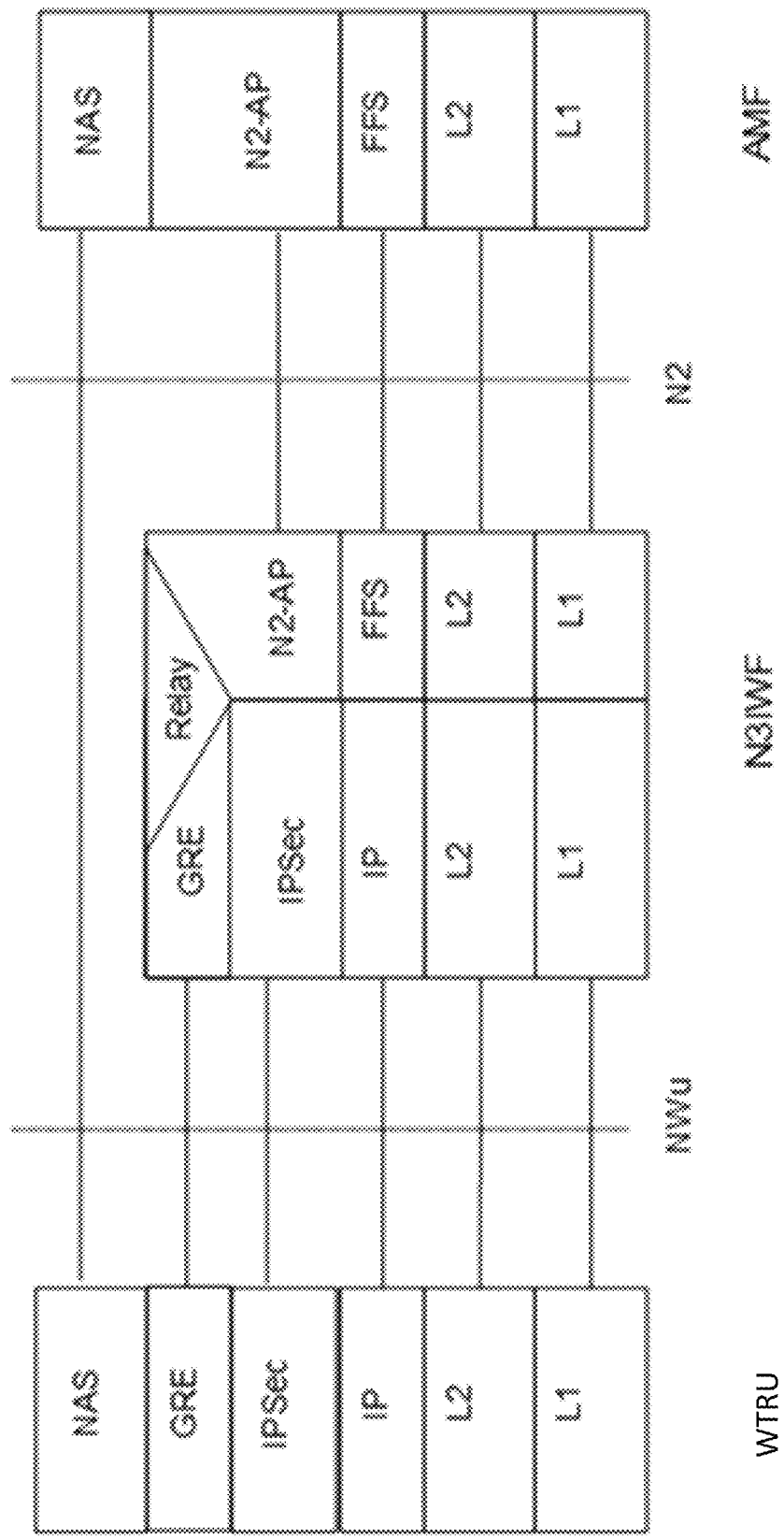
FIG. 3 illustrates an example control plane (CP) for non-access stratum (NAS) when CP internet protocol security (IPSec) security association (SA) is established.

A control plane may control aspects related to untrusted non-3GPP Access. FIG. 3 illustrates an example control plane (CP) for non-access stratum (NAS) when CP internet protocol security (IPSec) security association (SA) is established. The control plane interface between an Access Network (AN) and the 5G Core may support one or more of the following.

The control plane interface between an Access Network (AN) and the 5G Core may support the connection of multiple different kinds of AN to the 5GC via a control plane protocol, which may be an N2 AP protocol. The connection may be used for 3GPP and/or non-3GPP accesses.

The control plane interface between an Access Network (AN) and the 5G Core may support decoupling between the AMF and the other functions (e.g., the SMF). The N2-AP may support a subset of messages and/or information that the AMF may be responsible to relay between N2 and the SMF.

One or more of the following may be defined over N2.

N2 Interface Management may be performed for interface management. Interface management may not be related to a WTRU and may deal with configuration or reset of the N2 interface. Interface management may be applicable to an access (e.g., any access). Interface management may correspond to messages that carry some information on some access.

NAS transport and context management may be related for a WTRU.

NAS transport may be applicable to an access (e.g., any access). NAS transport may be configured to correspond to messages for UL NAS transport. UL NAS transport may carry some access dependent information such as User Location Information.

Context management may be applicable to an access (e.g., any access). The corresponding messages may carry some information on some access or some information that may be transparently forwarded by the AMF between the (R)AN and the SMF.

The N2 Application Protocol (N2-AP) may be the application layer protocol between the N3IWF and the AMF as shown in FIG. 3.

IPsec transport mode and GRE may be used to encapsulate NAS payload between WTRU and N3IWF as shown in FIG. 3.

Figure 4:
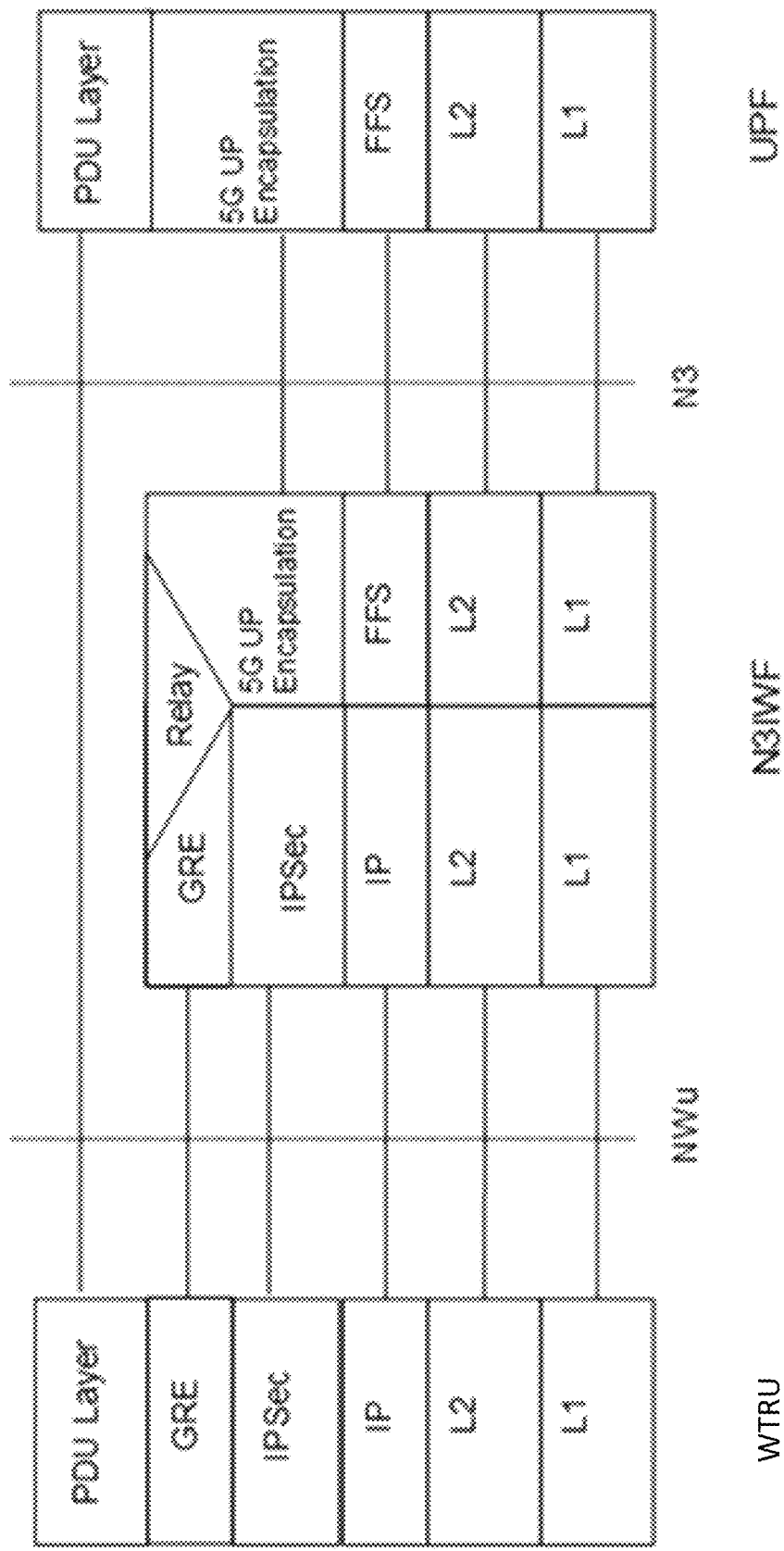
FIG. 4 illustrates an example user plane via non-3GPP interworking function (N3IWF).

A user plane may be established for untrusted non-3GPP access. FIG. 4 illustrates an example user plane via N3IWF. The protocol data unit (PDU) Layer shown in FIG. 4 may correspond to a PDU carried between the WTRU and the DN over a PDU session. A PDU session type may be IPv6, Ethernet, and/or the like. When the PDU session type is IPv6, the PDU session may correspond to one or more IPv6 packets. When the PDU session type is Ethernet, the PDU session may correspond to Ethernet frames, and/or the like.

5G UP Encapsulation protocol may tunnel user data between N3IWF and a user plane function (UPF). 5G UP Encapsulation tunnel may be per PDU session.

The N3IWF may relay the user data between a per-PDU session IPsec tunnel (e.g, over a NWu interface) and a corresponding N3 tunnel.

Figure 5:
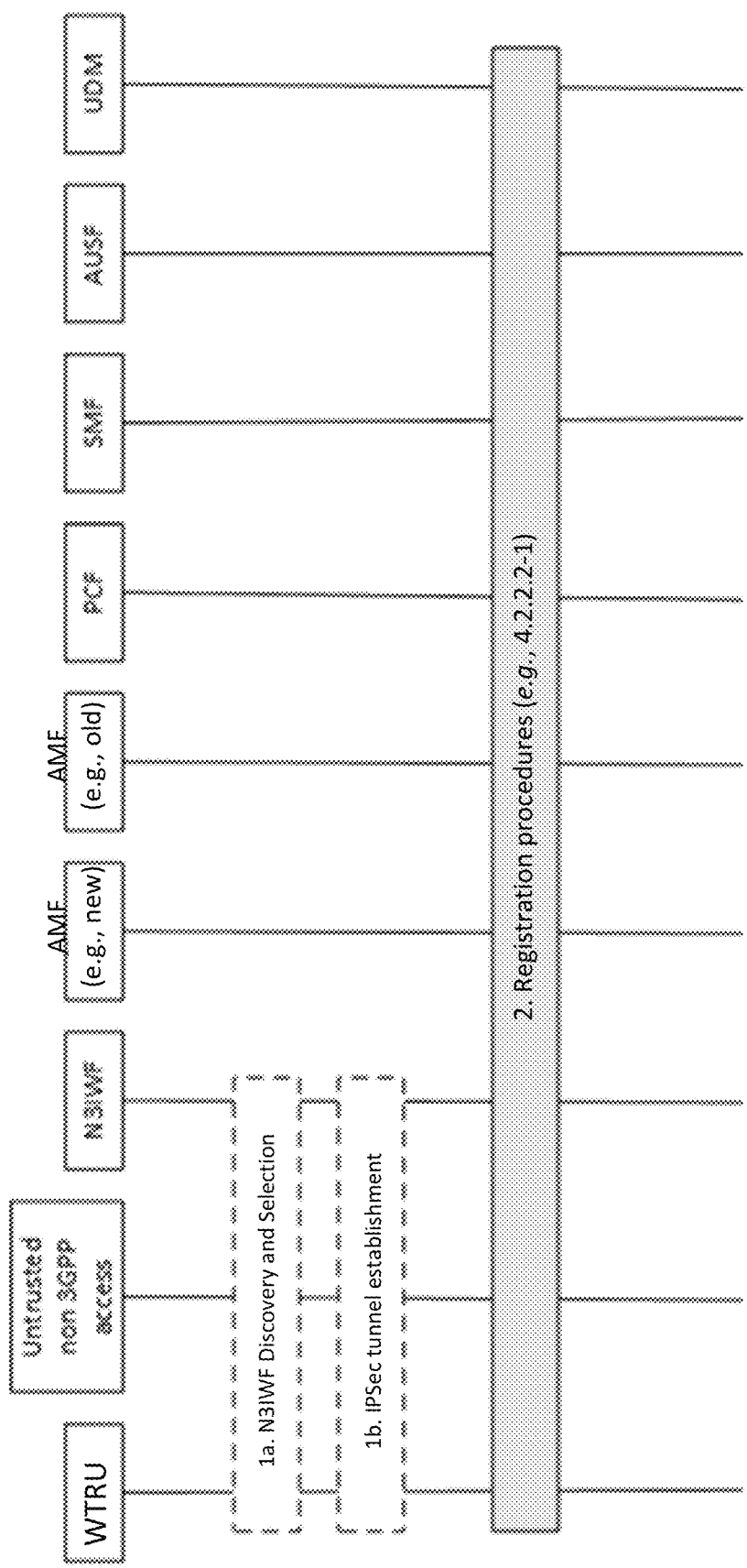
FIG. 5 illustrates an example registration via non-3GPP access.

A WTRU may perform registration via non-3GPP access. FIG. 5 illustrates an example registration via non-3GPP access. A WTRU may register to the 5GC network via an untrusted non-3GPP access network. For example, a WTRU may register to the 5GC network via an untrusted non-3GPP access network using the registration in TS 23.502 clause 4.2.2.2. One or more of the following may be involved in a registration request (e.g., initial part of a registration request). The numbers/elements shown in FIG. 5 may be presented for the purpose of reference. As such, the numbered actions may be performed in a different order (e.g., in whole or in part) and/or may be skipped.

The WTRU may discover and/or select the N3IWF. For example, the WTRU may discover and/or select the N3IWF using one or more of the evolved packet data gateway (ePDG) selection implementations in TS 23.402 clause 4.5.4. The WTRU may use IKEv2 to establish an IPsec tunnel with the selected N3IWF.

The WTRU may initiate the registration request. For example, one or more implementations (e.g., 1-22) in TS 23.502 clause 4.2.2.2 may be executed to initiate the registration request.

A WTRU may perform a service request via untrusted non-3GPP Access. The service request via untrusted non-3GPP Access may be used by a WTRU in CM-IDLE state over non-3GPP access. For example, a WTRU in CM-IDLE state over non-3GPP access may request the re-establishment of N2-AP signaling and/or may request the re-establishment of the N3 user plane for one or more (e.g., all) the PDU sessions which may be associated to the non-3GPP access.

The service request via untrusted non-3GPP access described herein may include one or more of the following. For example, the service request may use WTRU triggered service request in CM-IDLE state shown in TS 23.502 clause 4.2.3.2.

The service request may not be a response to a paging. For example, a network may not initiate the service request.

When the WTRU uses a service request, the WTRU may reactivate one or more (e.g., all) PDU sessions that were previously established on the non-3GPP access.

Figure 6:
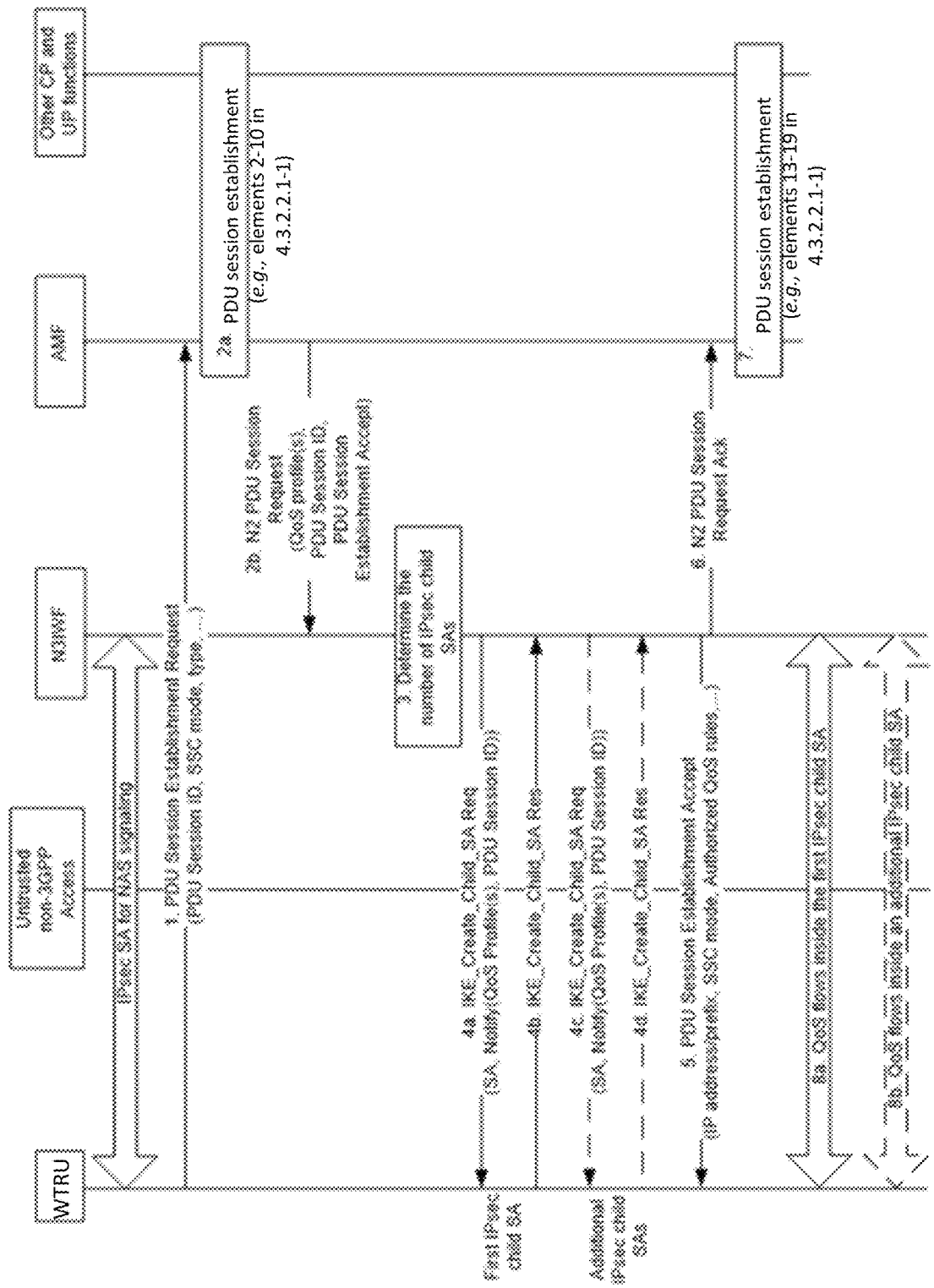
FIG. 6 illustrates an example protocol data unit (PDU) session establishment via untrusted non-3GPP access.

A WTRU may perform a WTRU requested PDU session establishment via untrusted non-3GPP access. FIG. 6 illustrates an example PDU session establishment via untrusted non-3GPP access. A WTRU may establish a PDU session via an untrusted non-3GPP access network. For example, the WTRU may establish a PDU session via an untrusted non-3GPP access network using one or more implementations in TS 203.502 clause 4.12.5. The numbers shown in FIG. 6 may be presented for the purpose of reference. As such, the numbered actions may be performed in a different order (e.g., in whole or in part) and/or may be skipped.

Figure 6A:
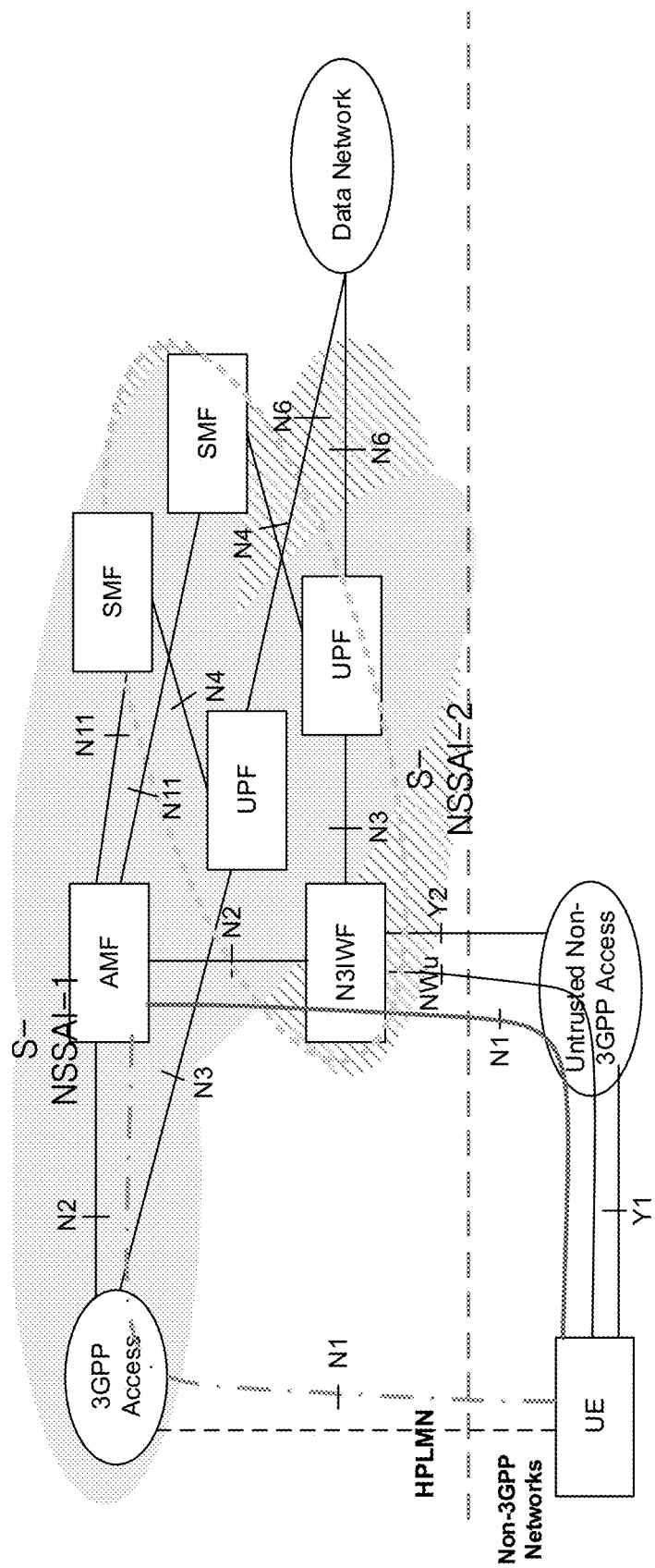
FIG. 6A illustrates an example system architecture for a 5G core network.
Figure 6B:
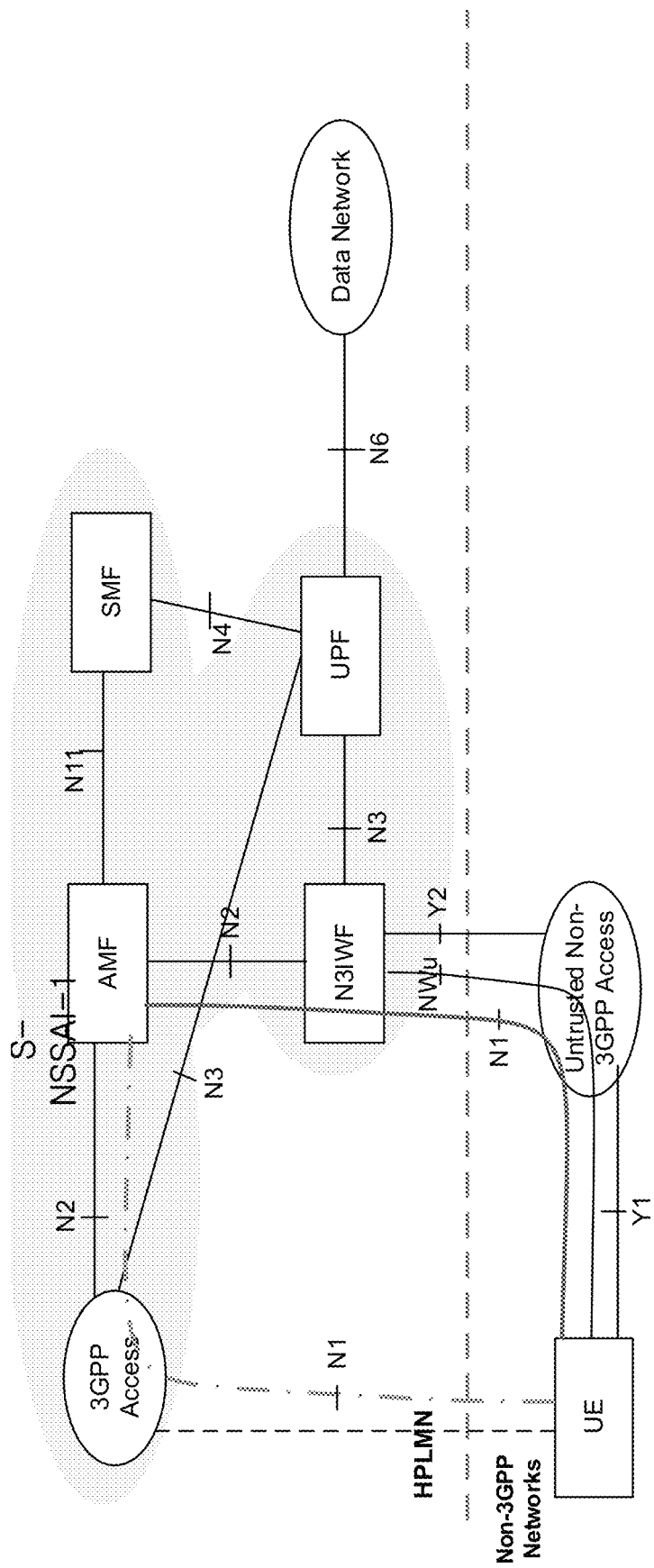
FIG. 6B illustrates an example system architecture for a 5G core network.

A WTRU may be configured to use network slices across multiple access networks (AN) in a 5G system. System architectures for supporting a non-3GPP access network may be implemented. FIG. 6A is an example of an architecture (e.g., a non-roaming architecture) for a 5G core network with non-3GPP access, where two different network slices are used to support 3GPP and non-3GPP access. FIG. 6B is an example of an architecture (e.g., a non-roaming architecture) for a 5G core network with non-3GPP access, where a single network slice is used to support both 3GPP and non-3GPP access.

A WTRU may be configured to perform independent registration over 3GPP and non-3GPP access networks. For example, FIG. 6A may illustrate an example of a WTRU registered to both 3GPP access and non-3GPP access. Independent N1 (NAS) signaling connections may be established for the different ANs upon successful registration. Independent registrations may result in allowed NSSAI lists being independently provided to the WTRU over each AN. The independently provided lists may contain the same collection of slices. In FIG. 6A, the WTRU (UE) is accessing two different slices over the two different ANs. In an example, the same slice may be used for both 3GPP and non-3GPP ANs as depicted in FIG. 6B. In FIG. 6B, the allowed NSSAI list that is sent to the WTRU (UE) upon successful registration may contain network slices that are associated with more than one tracking area (TA), e.g., since TAs for 3GPP and non-3GPP may be independently defined.

Traffic may be steered and/or switched between multiple access networks in a network, e.g., 5G network. A wireless transmit/receive unit (WTRU) may register over one or more of an access network. The access network may include a 3rd Generation Partnership Project (3GPP) access network and a non-3GPP access network. The WTRU may determine whether a multi-access PDU session or a single-access PDU session is available. The WTRU may establish a PDU session (e.g., single-access PDU session or multi-access PDU session) based on the determined availability. The WTRU may determine a traffic steering decision based on a traffic steering policy for the PDU session. The WTRU may transmit data over the access network using the established PDU session.

Figure 7:
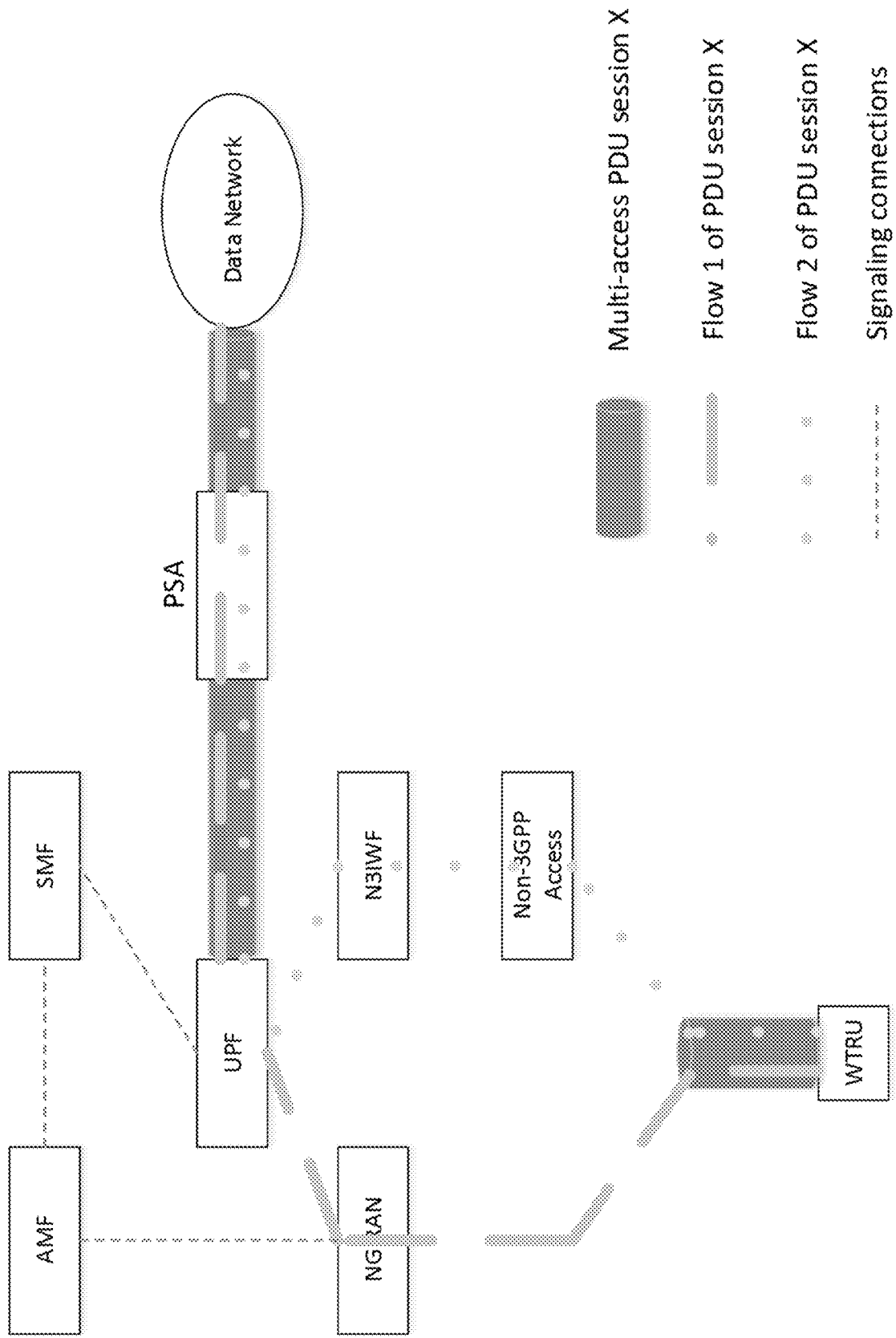
FIG. 7 illustrates an example PDU session over multiple accesses.

One or more network entities may perform PDU session management over multiple accesses. FIG. 7 illustrates an example PDU session over multiple accesses. PDU session establishment, PDU session modification, and/or PDU session release may apply to 3GPP access and/or non-3GPP accesses. For example, PDU session management over multiple accesses may use TS 23.502 section 4.3.2 for PDU session establishment, PDU session modification may use section 4.3.3, and PDU session release may use section 4.3.4. A WTRU and a network (NW) may establish and/or manage one or more PDU sessions (e.g., independently) over different type of accesses. A WTRU may be associated with and one or more network entities and may facilitate a (e.g., single) PDU session over 3GPP and/or non-3GPP accesses. Supporting a multi-access PDU session may be a prerequisite to carry out traffic switching between multiple accesses. A multi-access PDU session (e.g., a PDU session over multiple accesses) may be a PDU session where one or more PDUs associated with a PDU session are communicated over a 3GPP access network and one or more PDUs associated with the PDU session are (e.g., simultaneously) communicated over a non-3GPP access network.

Establishing a PDU session over multiple accesses may be described herein.

In an example, when a PDU session is established (e.g., initially established), one or more accesses may be presumed to carry the traffic of the session. One or more of the following may be considered. For example, deciding how a WTRU and/or a NW uses one or more accesses (e.g., instead of a single access) for a PDU session may be considered. For example, determining how a WTRU indicates the intention of using one or more accesses to the NW may be considered. Determining how a WTRU indicates the availability and/or identification of other accesses may be considered. For example, determining whether the signaling to establish a multi-access PDU session may be accomplished over a (e.g., single) access may be considered. Determining whether other accesses are involved may be considered. If other accesses are involved, determining how to select the access for the signaling exchange may be considered.

In an example, a PDU session may be established (e.g., initially established) over an access, e.g., 3GPP or non-3GPP access. The WTRU or the NW may decide to extend the PDU session onto more accesses. One or more of the following may be considered. For example, determining what triggers the inclusion of other accesses for a PDU session may be considered. For example, determining how to select the other accesses to be included into an existing PDU session may be considered.

When a multi-access PDU session is established, the multi-access PDU session may turn back into a single-access PDU session, e.g., when the connection to one access is lost.

If a multi-homed PDU session needs to be supported over multiple accesses, one or more of the following scenarios may be considered. For example, a single-homed multi-access PDU session may be turned into a multi-homed multi-access PDU session. For example, a multi-homed single-access PDU session may be turned into a multi-homed multi-access PDU session. For example, a multi-homed multi-access PDU session may be turned into a multi-homed single-access PDU session. For example, a multi-homed multi-access PDU session may be turned into a single-homed multi-access PDU session.

An access traffic steering policy may be used by the WTRU. Access traffic steering may select an appropriate (e.g., the most appropriate) access network for a data flow. The traffic steering may be WTRU and/or NW controlled. If the traffic steering is WTRU-controlled steering, the WTRU may select the access according to one or more steering policies and/or rules. The WTRU may be provided with assistance information by the NW. If the traffic steering is NW-controlled steering, the NW may make the steering decision based on WTRU measurement reports and/or NW side policies.

For WTRU-controlled steering, access network selection policies and/or rules may be provided to the WTRU. In evolved packet core (EPC), one or more access network selection policies and/or rules may have been defined, such as RAN rules access network discovery and selection function (ANDSF) based policies, and/or the like. One or more access network selection policies and/or rules for EPC may be reused in 5G for access traffic steering. In 5G multiple access scenario, a 5G WTRU may be able to perform registration over non-3GPP access network with the 5GC (e.g., AMF), and the 5GC (e.g., AMF) may have the access specific WTRU context. A 5G WTRU capable of performing registration over non-3GPP access network may provide accurate traffic steering among the access networks over which the WTRU registered.

Other types of polices (e.g., besides access traffic steering policies) may be available at the WTRU side, such as WTRU Route Selection Policies (URSP) (e.g., UE Route Selection Policies). The URSP may map an application flow (e.g., identified by a traffic filter in the URSP) to a target slice (e.g., identified by a single-network slice selection assistance information (S-NSSAI)), Data Network Name (DNN), continuity type (e.g., Service and Session Continuity (SSC) mode), and/or access network type (e.g., non-3GPP).

Table 1 may provide an example of URSP rule.

TABLE 1

An example of URSP rule.

| | |
|---|---|
| Traffic filter: App = App1, App2<br>Direct offload: Permitted<br>Slice Info: S-NSSAI-a<br>Access Type: Non-3GPP access | This URSP rule may associate the traffic of applications "App1" and "App2" with S-NSSAI-a.<br>It may enforce the following routing policy:<br>The traffic of application App1 and the traffic of application App2 may be transferred on a PDU session supporting S-NSSAI-a. If this PDU session is not established, the WTRU may attempt to establish the PDU session over Access Type = non-3GPP access. If the PDU session cannot be established, the traffic of these applications may be directly offloaded to non-3GPP access. |

URSP for some access network selection policy functions may not cover an access network selection policy that includes one or more of the following selection criteria: WTRU location, QoS requirement, and/or the like. If a separate access network selection policy needs to be configured at the WTRU, the relationship between the access network selection policy and URSP and how they interact with each other may be studied.

One or more network entities may be configured to implement network slicing support for multiple accesses. The core network part of a network slice may be non-access-specific and may be connected via different or multiple access networks. The selection of a Network Slice Instance (NSI) may be based on S-NSSAI information, and access network type information in S-NSSAI may not be available.

When a WTRU has already registered or established PDU sessions over an access (e.g., 3GPP access) and serving NSIs have been selected, whether the network slice selection over the other access (e.g., non-3GPP access) should be independent of the existing serving NSIs or somehow should be related to the existing serving NSIs may be studied. One or more of the following may be determined. Whether a WTRU requests the same set of S-NSSAIs or whether the WTRU requests a different set of S-NSSAIs may be determined, e.g., when a WTRU registers over different types of access networks. How a WTRU chooses the set of S-NSSAIs for a specific access may be determined. Whether the requested S-NSSAIs for another access should be constrained by the existing allowed S-NSSAIs received over the previous access when a WTRU has already registered with the network over an access may be determined. Whether it is possible or necessary to receive different allowed S-NSSAIs for different accesses may be determined.

A QoS model, e.g., a 5G QoS model, may include reflective QoS mechanism. For example, the QoS mechanism may be supported over 3GPP and/or non-3GPP access networks.

A network (e.g., a network entities such as AMF, SMF, or N3IWF) may decide to stop using access traffic steering, switch, and splitting support (ATSSS) for one or more (e.g., all) WTRUs. A UPF may be using reflective QoS indicator (RQI) for one or more flows of one or more WTRUs. A UPF may continue to use RQI for traffic sent via the N3IWF. A 3GPP network, e.g., an AMF and/or SMF, may continue to use reflective QoS for the same WTRUs, while reflective QoS over non-3GPP access may be stopped. A same UPF may be sending packets on the N3 interface towards a 3GPP RAN and/or a N3IWF. When reflective QoS is not to be used for a set of WTRUs, the UPF may be informed to stop applying RQI. This may reduce the processing load at the N3IWF. Techniques to address redundant or unnecessary use of RQI for a flow may be implemented.

In access traffic switching, when a QoS flow or a service data flow is switched from a 3GPP access network to a non-3GPP access network, or is split to be transferred over multiple access network (e.g., simultaneously), one or more of the following may be considered.

A QoS rule related to the service data flow may be changed when the access network is changed. Non-3GPP access networks may have a different QoS mechanism and/or implementation compared to 3GPP access networks. For example, a guaranteed bit rate (GBR) QoS flow may not be supported over non-3GPP access networks. For example, standard and/or pre-configured 5G QoS indicators (5QIs) may not be supported by non-3GPP access networks. One or more different QoS rules may be used when the data flow switches to a different access. One or more proper QoS rules may be used for a data flow on one or more access networks.

In a 5G QoS model, QoS flow identity (QFI) and/or RQI in N3 tunnel packets may pass through to the WTRU over a non-3GPP access network. The QFI and/or RQI may be included in an extended General Routing Encapsulation header. Reflective QoS mechanisms may continue to work for non-3GPP access networks. One or more determinations may be made on whether GRE encapsulation is implemented for non-3GPP access networks, or whether the extension of standard GRE header to include QFI and RQI is feasible, or whether one or more (e.g., all) 5G WTRUs support extended GRE encapsulation. The network or the N3IWF may not be able to pass QFI and/or RQI through certain non-3GPP access networks to the WTRU. A reflective QoS feature for non-3GPP access may be implemented.

Distinct allowed NSSAI lists may be maintained when a WTRU is connected over multiple access network types (e.g., 3GPP and non-3GPP). In an example, a WTRU may be provided with independent allowed NSSAI lists during registration over multiple ANs. This may result in duplication of information and cumbersome reconciliation of data across the network and the WTRU, for example, if any of the network slices are modified across an access network.

In an example, a network slice may updated to support additional UPFs. This update may be valid for 3GPP access, non-3GPP access, or both 3GPP and non-3GPP access. Two independent implementations may be triggered over different access networks to update the allowed NSSAI list (e.g., either over a registration or a generic WTRU configuration update).

A WTRU and one or more network entities may perform multi-access PDU session management. One or more of the following may apply: initial multi-access PDU session establishment, initial single-access PDU session extended to multi-access PDU session, and/or modification of multi-access PDU session.

Initial multi-access PDU session establishment may be described herein. When a PDU session establishment request is triggered at a WTRU, e.g., upon the request by an application, the WTRU may determine whether multiple accesses (e.g., 3GPP access network and/or non-3GPP access network) are allowed and/or possible to be used for a (e.g., single) PDU session.

In an example, a configured NSSAI or a stored allowed NSSAI may have an indication whether a S-NSSAI supports multiple accesses for a (e.g., single) PDU session. If the target S-NSSAI supports multi-access PDU session, the WTRU may request to establish the PDU session over multiple accesses, e.g., at the same time.

In an example, URSP rules provisioned in the WTRU may indicate that multiple accesses are allowed for the target PDU session. Table 2 provides an example of URSP rule. The Access Type in the URSP rule may indicate 3GPP access and/or non-3GPP access. The Access Type may allow the WTRU to establish the target PDU session over both accesses (e.g., 3GPP access and non-3GPP) at the same time.

TABLE 2

Example URSP Rule

| Example URSP Rule | Comments |
| --- | --- |
| Traffic filter: App = App1, App2<br>Direct offload: Permitted<br>Slice Info: S-NSSAI-a<br>Access Type: 3GPP access and/or<br>Non-3GPP access | This URSP rule may associate the traffic of applications "App1" and "App2" with S-NSSAI-a.<br>The rule may enforce the following routing policy:<br>the traffic of application App1 and the traffic of application App2 may be transferred on a PDU session supporting S-NSSAI-a. If this PDU session is not established, the WTRU may attempt to establish the PDU session over 3GPP access or non-3GPP access, or over the both accesses, e.g., at the same time. If the PDU session cannot be established, the traffic of the applications may be offloaded (e.g., directly) to non-3GPP access. |

In an example, the WTRU may consider the availability of the other access or the registration status over the other status. For example, if the WTRU has dual-registered over both 3GPP access and non-3GPP access, the WTRU may consider using both accesses for a (e.g., new) PDU session.

In examples, the WTRU may indicate its support or the presence of a local policy. The local policy may allow the WTRU to use traffic steering across one or more (e.g., multiple) access technologies. The WTRU may send an indication of its support or presence of the local policy and may include the supported access technologies to the CN (e.g., AMF and/or SMF in MM and/or session management (SM) messages, respectively). The network may determine if the feature described herein is allowed for the WTRU. The WTRU may receive a NAS message (e.g., that may be a response to a previous NAS message from the WTRU or a new NAS message), which may include an indication to use traffic steering. The NAS message may indicate rules and/or policies that govern which flows may be steered across which access technologies. The WTRU may perform a registration over at least one access technology, e.g. non-3GPP access, for which steering is allowed and over which the WTRU is currently not registered. The WTRU may start using traffic steering according to the rules or policies for steering. For example, the WTRU may start using traffic steering according to the rules or policies for steering after the registration.

One or more examples described herein may be used separately or in combination for the WTRU to determine whether to establish a multi-access PDU session or a single-access PDU session.

A WTRU may choose an access network for exchanging session management signaling, e.g., when the WTRU decides to establish a multi-access PDU session. The WTRU may be configured with the priority of access networks for signaling exchange. For example, when both 3GPP access and non-3GPP access are available, 3GPP access may have a higher priority and may be used for session management signaling. When the WTRU decides to establish a PDU session over multiple accesses, the WTRU may be registered with or connected to an access network (e.g., 3GPP access). For the case where the WTRU is registered with or connected to an access network, the WTRU may try to register and/or connect to the other access (e.g., non-3GPP access) before initiating a multi-access PDU session establishment request.

The WTRU may include an indication in the PDU session establishment request message. For example, the WTRU may include an indication in the PDU session establishment request message that the PDU session is intended to be carried over one or more additional access networks, e.g., by including an indication in the access type IE in the mobility management (MM) part of the PDU session establishment request message. The WTRU may use a special format of session ID (e.g., PDU session ID) to indicate the choice of multi-access. For example, one or more bits in PDU session ID may be used to indicate whether the request is a single-access or multi-access.

The WTRU may include the registration status (e.g., whether the WTRU is registered or not) over the additional access networks in a request message. The WRTU may include an indication of whether the additional access network is trusted or non-trusted in the request message. The WTRU may include the identification of the N3IWF through which the additional access network is connected to the 5G core network in the request message. The WTRU may include the identification of the additional access network, such as the WLAN identifier, in the request message. The WTRU may include the area identification (e.g., the registration area) of the additional access network in the request message. The WTRU may include the identification of the PLMN that the additional access network belongs to in the request message.

Upon receiving the PDU session establishment request intended for multiple access networks, the AMF may check whether the multi-access PDU session is allowed for the WTRU. For example, the AMF may check one or more of the following. The AMF may check the WTRU subscription data to determine whether multi-access PDU session is allowed for the WTRU. The AMF may check the registration state for the additional access network. The AMF may not allow the multi-access PDU session to be established if the AMF has not registered over the intended additional access network. The AMF may check whether the target network slice instance (NSI) (e.g., identified by the S-NSSAI) supports multi-access. Checking whether the target NSI supports multi-access may be performed at a later time, e.g., by the SMF instead of by the AMF.

The AMF may invoke the PDU session creation service of the serving SMF and may pass on the necessary information received in the PDU session establishment request message to the serving SMF, e.g. if the AMF verification result indicates that multi-access PDU session is allowed.

The AMF may respond with a PDU session reject message with an appropriate cause value, e.g., invalid S-NSSAI, WTRU not registered on the other access (e.g., 3GPP or non-3GPP), subscription error, and/or the like, e.g. if the AMF determines that multi-access PDU session may not be established.

The SMF may perform one or more of the following checks to verify whether the multi-access PDU session can be established. The SMF may check whether the target NSI (e.g., identified by the S-NSSAI) supports multi-access. Checking whether the target NSI supports multi-access may be carried out by the AMF, e.g. instead of the SMF. The SMF may check whether a user plane path can be established between the 5GC and the N3IWF. The SMF may check whether the SSC mode included in the request message is allowed for a multi-access PDU session.

The SMF may continue to perform PDU session establishment, e.g. if the multi-access PDU session can be established. For example, the PDU session establishment may include retrieving a QoS policy. PDU session establishment may include selecting UPFs. PDU session establishment may include creating user plane connections. The SMF may confirm with an AMF that the multi-access PDU session has been successfully established. The AMF may forward an PDU session establishment accept message to the WTRU.

The SMF may respond with a PDU session reject message or N11 reject message to the AMF with an appropriate cause value, e.g., SSC mode not valid, multi-access not allowed, and/or the like, e.g. if the SMF decides that multi-access PDU session may not be established.

The AMF may send a PDU session establishment accept message (e.g., the same PDU session establishment accept message described herein) or a simplified version of the message over the second access network to the WTRU. The message may verify that the second access network is usable. The WTRU may choose not to use the second access network for the PDU session (e.g., not to transfer the traffic over the second access), e.g. if the PDU session establishment accept message has not been received over the second access network.

Figure 8:
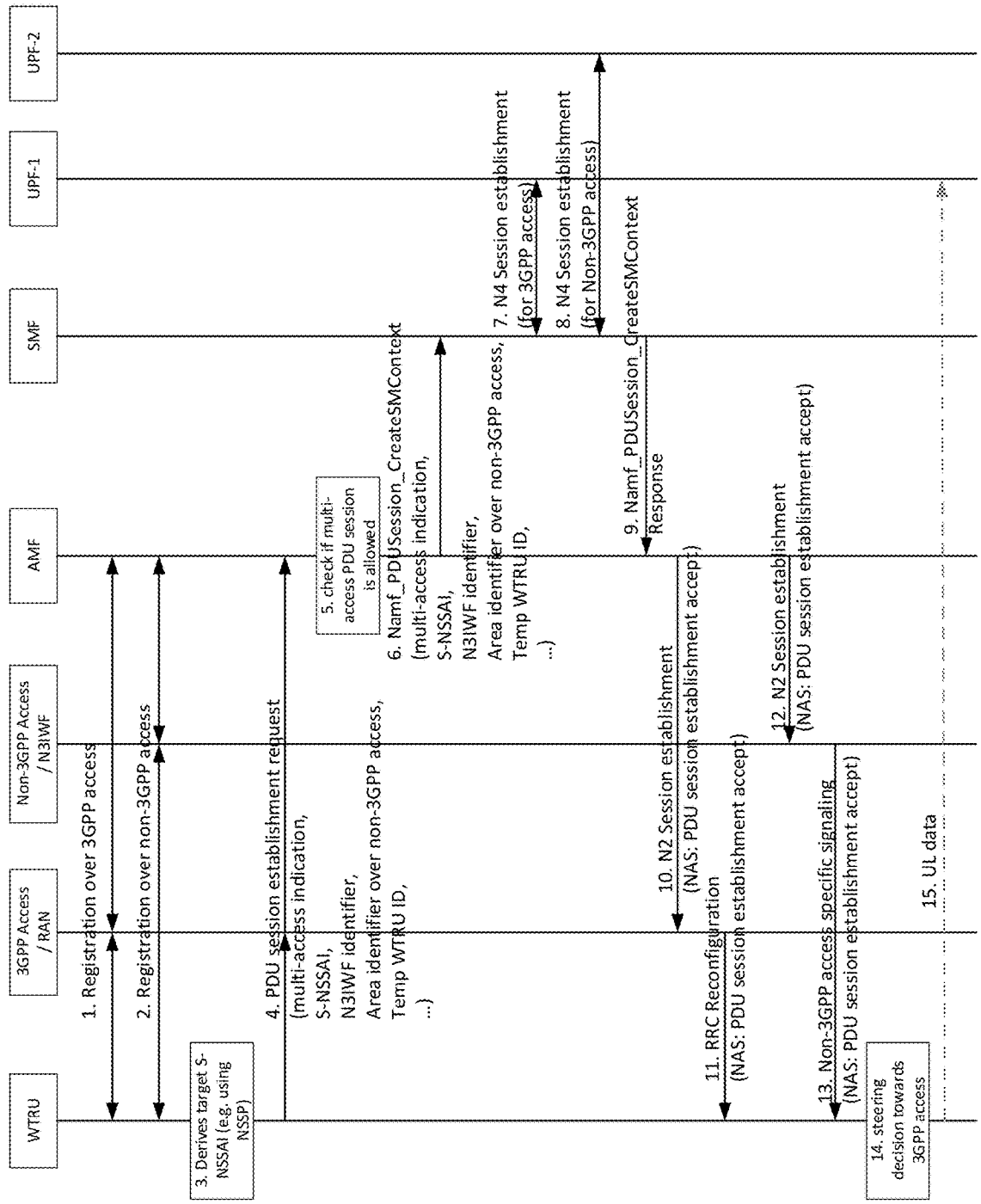
FIG. 8 illustrates an example of establishing a multi-access PDU session.

FIG. 8 illustrates an example of establishing a multi-access PDU session. The numbers shown in FIG. 8 may be presented for the purpose of reference. As such, the numbered actions may be performed in a different order (e.g., in whole or in part) and/or may be skipped.

A WTRU may be registered (e.g., successfully) to the 5G core over a 3GPP access network (e.g., element 1 shown in FIG. 8).

The WTRU may be registered (e.g., successfully) to the 5G core over a non-3GPP access network (e.g., element 2 shown in FIG. 8). The WTRU may be registered to the 5G core over the 3GPP access network and the non-3GPP access network at the same time.

The WTRU may receive a data request from an application (e.g., element 3 shown in FIG. 8). The WTRU may derive a target S-NSSAI. For example, the WTRU may derive the target S-NSSAI by applying a configured Network Slice Selection Policy (NSSP). If the target S-NSSAI is allowed for both 3GPP access and non-3GPP access, and if the WTRU is dual-registered over both 3GPP and non-3GPP access, the WTRU may decide to initiate a multi-access PDU establishment request for both 3GPP access and non-3GPP access.

The WTRU may send a NAS signaling PDU session establishment request over the 3GPP access network to a serving AMF (e.g., element 4 shown in FIG. 8). In the request message, the WTRU may include an indication for multi-access support and other necessary information (e.g., an N3IWF identifier, area identifier over non-3GPP access network, and/or the like).

The AMF may check the WTRU subscription data, the target NSI's support and local configuration, and/or policy to verify if the multi-access PDU session is allowed for the WTRU, for example when the AMF receives the PDU establishment request and recognizes the intention for multi-access support (e.g., element 5 shown in FIG. 8).

The AMF may select a serving SMF and may create a PDU session (e.g., element 6 shown in FIG. 8), for example if multi-access PDU session is allowed for the WTRU. For example, the AMF may create the PDU session by invoking a Namf_PDUSession_CreateSMContext service of the SMF. The AMF may pass the multi-access indication and/or other necessary information (e.g., an S-NSSAI, N3IWF identifier, area identifier over non-3GPP access, Temp WTRU-ID, and/or the like) to the SMF.

The serving SMF may select a UPF for the 3GPP access and may establish an N4 session for the 3GPP access (e.g., element 7 shown in FIG. 8). The UPF may return CN tunnel information to the SMF.

The serving SMF may select the (e.g., same) UPF-1 or another UPF for the non-3GPP access and may establish an N4 session for the non-3GPP access (e.g., element 8 shown in FIG. 8). The UPF may return the CN tunnel information to the SMF. If a different UPF-2 is selected for non-3GPP access, the selected UPF may be configured as an intermediary UPF, which may use the UPF-1 as the PDU session anchor. The UPF-2 may be an (e.g., additional) anchor, which may turn the PDU session into a multi-homed PDU session.

The serving SMF may confirm to the AMF that the PDU session has been (e.g., successfully) established and may pass the N1 SM information (e.g., a NAS PDU session establishment accept message) and/or N2 SM information (e.g., QoS profiles, CN tunnel information for 3GPP access, and/or non-3GPP access) (e.g., element 9 shown in FIG. 8).

The AMF may establish an N2 session towards the 3GPP RAN (e.g., element 10 shown in FIG. 8). The AMF may pass the CN tunnel information to the RAN, and the RAN may allocate N3 tunnel information. The AMF may pass a NAS message of PDU session establishment accept to the RAN.

The RAN may forward the NAS message of PDU session establishment accept to the WTRU in RRC signaling (e.g., element 11 shown in FIG. 8).

The AMF may establish an N2 session towards the N3IWF, which may interface the non-3GPP access network (e.g., element 12 shown in FIG. 8). The AMF may pass the CN tunnel information to the N3IWF, and the N3IWF may allocate the N3 tunnel information. The AMF may pass the NAS message of PDU session establishment accept to the N3IWF. The network may accept the request for an (e.g., single) access. If the network can accept the request from a single access, the PDU establishment accept message may notify that the PDU session has been accepted for a single access type, e.g., 3GPP access. The network may not accept the request (e.g. for a single access). If the network cannot accept the request from a single access, the network may include the reason for not accepting the multi-access PDU session request (e.g., invalid S-NSSAI, WTRU not registered on the other access (e.g., 3GPP or non-3GPP), subscription error, and/or the like).

The N3IWF may forward the NAS message of PDU session establishment accept to the WTRU in non-3GPP access specific signaling (e.g., element 13 shown in FIG. 8). The WTRU may check the PDU session ID in the message. The WTRU may discard the message, for example if the WTRU has already received a PDU establishment accept message with the same PDU session ID.

The WTRU may make a traffic steering decision based on configured steering policies (e.g., element 14 shown in FIG. 8). The WTRU may decide to route traffic to the 3GPP access network.

The WTRU may send UL data over the 3GPP access network (e.g., element 15 shown in FIG. 8).

For example, a WTRU may initiate access for a PDU session over multiple access networks. The WTRU may register with two or more access networks. The one or more access networks may include a 3GPP access network and a non-3GPP access network. The 3GPP access network and the non-3GPP access network may be associated with a single PLMN.

The WTRU may determine whether utilizing multiple access networks is allowed for the PDU session, e.g. based on an indication in one or more NSSAIs associated with the PDU session. The WTRU may determine to request a multi-access PDU session. The determination may be based on the WTRU being registered over the two or more access networks. The determination may be based on one or more configured policies in the WTRU, e.g. indicating that multi-access is preferred. The determination may be based on a network slice associated with the PDU session supporting multi-access. The WTRU may send a request for multi-access (e.g., a multi-access PDU session establishment request message) to a network (e.g., an AMF), which may include, for example, an explicit indication that the WTRU is requesting a multi-access PDU session. The request may include, for example, a PDU session ID for the PDU session.

The network may receive the request for multi-access from the WTRU. The network may establish a multi-access PDU session for the WTRU. The network may send a confirmation message indicating that the multi-access PDU session has been established to the WTRU. The confirmation message may be sent over the 3GPP access network, the non-3GPP access network, or both. The WTRU may send uplink data over the 3GPP access network and the non-3GPP access network, e.g. in accordance with the established multi-access PDU session.

When the network receives the multi-access PDU session establishment request message from the WTRU (e.g., element 4 shown in FIG. 8), and the network decides not to establish the multi-access PDU session (e.g., after element 5 or element 6 shown in FIG. 8), the network may send a PDU session establishment trigger NAS message to the WTRU. The message may indicate the WTRU to establish another PDU session on a different access type. When the WTRU receives the message (e.g., the PDU session establishment trigger NAS message), the WTRU may send the PDU session establishment request on the different access type as described herein. The WTRU may include the same PDU session ID. The WTRU may include one or more other PDU session parameters in the PDU session request on a different access type.

When the AMF receives the PDU session request on a different access with the same PDU session ID and/or other PDU session parameters, the AMF may determine that the request is to establish a multi-access PDU session. The AMF may proceed with multi-access PDU session establishment (e.g., element 5 shown in FIG. 8).

When a multi-access PDU session is established, the access network that has higher priority, e.g., the access network that has been used to carry session management signaling, may be designated as the master access network. The access network with lower priority may be designated as a secondary access network. Such access priority indication may be transmitted to the WTRU during PDU session establishment, e.g., in a PDU establishment accept message (e.g., element 10, 11 shown in FIG. 8). The network may allow downlink data transmission when the WTRU is connected (e.g., in CM_CONNECTED mode) over the master access network. If the WTRU is in IDLE state over the master access, the WTRU may not attempt UL data transmission, and the network may not attempt DL transmission over the secondary access (e.g., even if the WTRU is connected with the secondary access network). When the WTRU enters Connected mode over the master access network, the WTRU may include the multi-access PDU session in the selective PDU session list to be activated.

In examples, the WTRU may initiate establishment for a single-access PDU session. After receiving the PDU session establishment request, the NW may decide to establish a multi-access PDU session according to the WTRU's subscription information and/or registration status over various access networks and/or network policies. The NW may indicate that the PDU session is set up for multiple accesses and/or the information of the additional access network (e.g., an N3IWF identifier) in the PDU session establishment accept message.

A WTRU and/or one or more network entities may extend an initial single-access PDU session to a multi-access PDU session. The initial single-access PDU session may be established over 3GPP access network and/or non-3GPP access. The single-access PDU session may be extended to a multi-access PDU session. The initial single access type may be a 3GPP access type, which may be extended to having one or more non-3GPP type accesses. The initial single access type may be a non-3GPP access type, which may be extended to having a 3GPP access type.

Extension of a PDU session to multi-access may be triggered by another access network becoming available. Extension of a PDU session to multi-access may be triggered by the existence of a coverage hole in an access network. Extension of a PDU session to multi-access may be triggered by degradation of the signal strength and/or quality below certain criteria. Extension of a PDU session to multi-access may be triggered by a large traffic throughput on the PDU session. Extension of a PDU session to multi-access may be triggered by new application traffic on the PDU session having a different QoS and/or security requirement.

Extension of a PDU session to multi-access may be triggered by another access network becoming available. For example, the WTRU may discover a non-3GPP access network. The WTRU may register with the 5G core network over the non-3GPP access network. The WTRU may extend the PDU session over the non-3GPP access network.

Extension of a PDU session to multi-access may be triggered by the existence of a coverage hole in an access network. Extension of a PDU session to multi-access may be triggered by degradation of the signal strength and/or quality below certain criteria. If a coverage hole in an access network appears and/or the signal strength/quality has degraded below certain criteria, the WTRU may extend the PDU session to another access network and may (e.g., later) move traffic to the new access to achieve service continuity.

Extension of a PDU session to multi-access may be triggered by a large traffic throughput on the PDU session. The WTRU may use another access network to offload the traffic.

Extension of a PDU session to multi-access may be triggered by new application traffic on the PDU session. The new traffic may have a different QoS and/or security requirement, which may make the current access network not appropriate. The PDU session may be extended for the case where a new application traffic has a different QoS and/or security requirement.

A WTRU may establish a single-access PDU session over a 3GPP or a non-3GPP access network. The WTRU may extend the established the single-access PDU session to additional multi-access PDU session over non-3GPP or 3GPP access network, respectively. The WTRU may establish one or more multi-access PDU sessions over one or more of the 3GPP or non-3GPP access network. The WTRU may modify one or more of the established multi-access PDU session to have a single-access PDU session.

Figure 9:
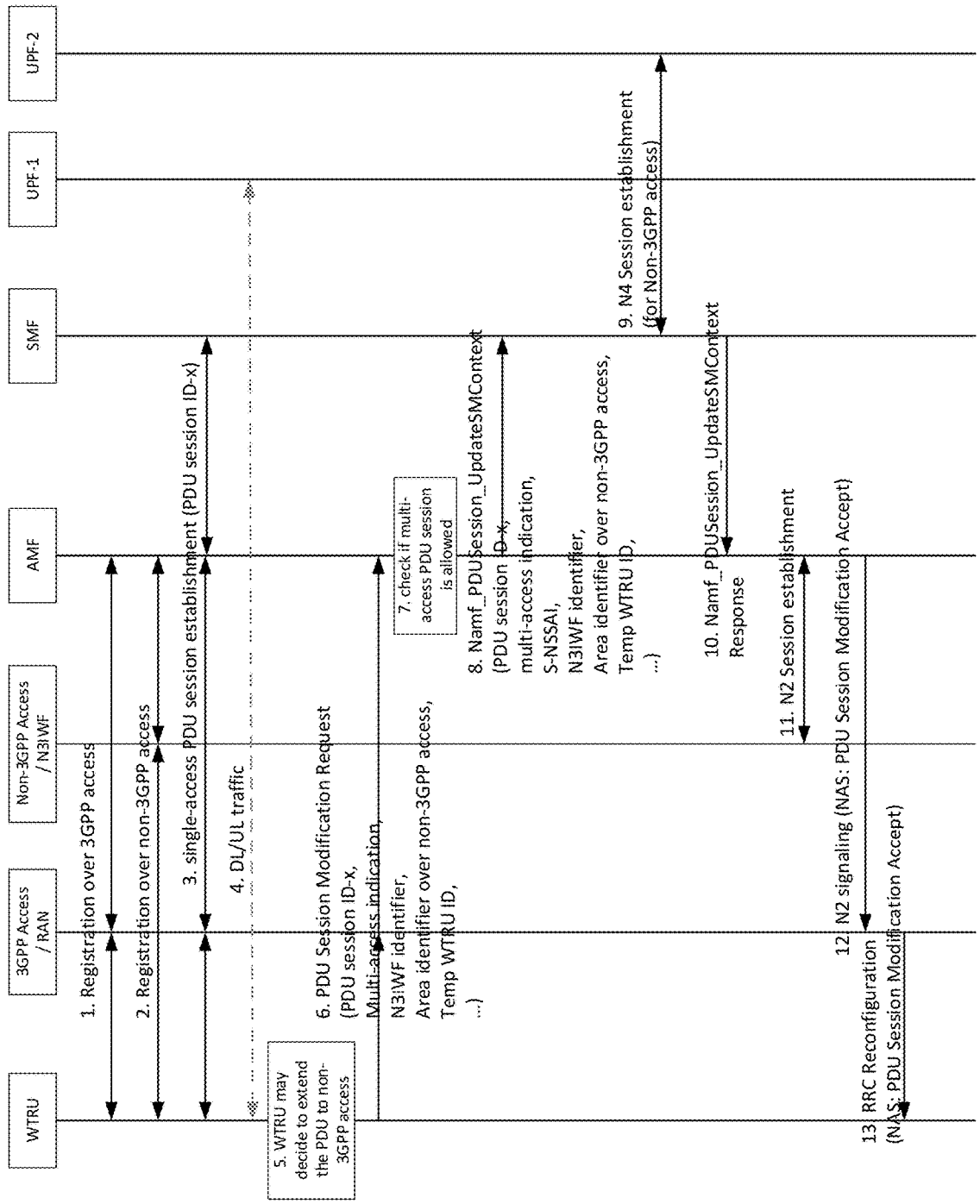
FIG. 9 illustrates an example of extending a single-access PDU session to multi-access PDU session.

FIG. 9 illustrates an example of extending a single-access PDU session to a multi-access PDU session. The numbers shown in FIG. 9 may be presented for the purpose of reference. As such, the numbered actions may be performed in a different order (e.g., in whole or in part) and/or may be skipped. A WTRU may extend and/or divide an established single-access PDU session (e.g., over 3GPP access) to additional non-3GPP access. Access networks (e.g., 3GPP access network and/or non-3GPP access network) may be in the same PLMN. The WTRU may be served by a (e.g., single) AMF for both accesses.

The WTRU may be registered (e.g., successfully) to the 5G core over a 3GPP access network (e.g., element 1 shown in FIG. 9).

The WTRU may be registered (e.g., successfully) to the 5G core over a non-3GPP access network (e.g., element 2 shown in FIG. 9).

The WTRU may have established a (e.g., normal) single-access PDU session over 3GPP access (e.g., element 3 shown in FIG. 9).

The UPF-1 may be selected for the PDU session. The WTRU may start transferring traffic on the PDU session (e.g., element 4 shown in FIG. 9).

The WTRU may decide to extend the PDU session to additional non-3GPP access due to some triggering events described herein (e.g., element 5 shown in FIG. 9).

The WTRU may send a NAS session management message, e.g., a PDU Session Modification Request, to the serving AMF (e.g., element 6 shown in FIG. 9). The message may be sent over 3GPP access and/or over non-3GPP access. A multi-access indication may be included in the message, and other necessary information about the additional non-3GPP access (e.g., an N3IWF identifier, area identifier over non-3GPP access network, temporary WTRU-ID, and/or the like) may be included.

The serving AMF may check whether a multi-access PDU session is allowed for the WTRU (e.g., element 7 shown in FIG. 9). For example, the AMF may check the WTRU subscription data, the target NSI's support and local configuration, and/or policy to verify if the multi-access PDU session is allowed for the WTRU.

If a multi-access PDU session is allowed, the AMF may invoke Namf_PDUSession_UpdateSMContext service of the SMF to modify the PDU session (e.g., element 8 shown in FIG. 9). The AMF may pass the multi-access indication and/or other necessary information (e.g., a PDU session ID, S-NSSAI, N3IWF identifier, area identifier over non-3GPP access, Temp WTRU-ID, and/or the like) to the SMF.

The serving SMF may select the same UPF-1 or another UPF for the non-3GPP access and may establish an N4 session for the non-3GPP access (e.g., element 9 shown in FIG. 9). The UPF may return the CN tunnel information to the SMF. If a different UPF-2 is selected for non-3GPP access, the UPF may be configured as an intermediary UPF and may use the UPF-1 as the PDU session anchor. The (e.g., new) UPF-2 may be an additional anchor, which may turn the PDU session into a multi-homed PDU session.

The serving SMF may confirm to the AMF that the PDU session has been successfully modified and may pass the N1 SM information (e.g., NAS PDU Session Modification Accept) and/or N2 SM information (e.g., QoS profiles and/or CN tunnel information for non-3GPP access) (e.g., element 10 shown in FIG. 9).

The AMF may establish an N2 session towards the N3IWF, which may interface the non-3GPP access network (e.g., element 11 shown in FIG. 9). The AMF may pass the CN tunnel information to the N3IWF, and the N3IWF may allocate the N3 tunnel information.

The AMF may send a NAS message to 3GPP RAN (e.g., element 12 shown in FIG. 9). For example, the AMF may send a NAS message that may include a PDU Session Modification Accept via N2 signaling to the 3GPP RAN.

The RAN may forward the NAS message of PDU Session Modification Accept to the WTRU in RRC signaling (e.g., element 13 shown in FIG. 9). The AMF may choose to send the NAS message over a non-3GPP access network, e.g., instead of a 3GPP access network.

A WTRU and/or a network entity may initiate a modification of multi-access PDU session. A WTRU may initiate a change from a multi-access PDU session into a single-access PDU session. A NW may initiate a change from a multi-access PDU session into a single-access PDU session.

A WTRU may initiate a change from a multi-access PDU session into a single-access PDU session, for example by requesting the network to change an existing multi-access PDU session into a single-access PDU session. The WTRU may remove the secondary access network from the existing multi-access PDU session to make the existing multi-access PDU session a (e.g., normal) single-access PDU session.

The WTRU may initiate a request to remove the secondary access from a PDU session when one or more of the following situations occur. The WTRU may initiate a request to remove the secondary access from a PDU session when the WTRU's registration update (e.g., due to mobility) over the secondary access network (e.g., non-3GPP access network) is rejected or failed. The WTRU may initiate a request to remove the secondary access from a PDU session when the WTRU de-registers over the secondary access network. The WTRU may initiate a request to remove the secondary access from a PDU session when the WTRU detects that the connection to the secondary access network is lost or the service quality over the secondary access is degenerated below certain criteria. The WTRU may initiate a request to remove the secondary access from a PDU session when the WTRU moves out of the service area of the secondary access network or the N3IWF. The WTRU may initiate a request to remove the secondary access from a PDU session when the WTRU receives a configuration or policy update which does not allow multiple accesses for the PDU session.

The WTRU may send a session management signaling (e.g., PDU Session Modification Request) to the serving AMF and/or SMF, e.g., when the WTRU decides to remove the secondary access from a PDU session and the WTRU is in a Connected mode over the master access network. The WTRU may include the PDU session ID and/or an indication that the PDU session is no longer intended for multiple accesses. If a special format of PDU session ID is used to indicate the single-access or multi-access choice, the WTRU may change one or more bits in the PDU session ID to indicate the new choice, and the PDU session may have a new PDU session ID.

The WTRU may steer traffic to the master access before the WTRU initiates the PDU session modification request, for example if the traffic is steered over the secondary access network when the WTRU decides to remove the secondary access.

The WTRU may initiate the change request, for example, when the WTRU enters Connected mode over the master access. The WTRU may include the multi-access PDU session ID in the selected PDU session list in the first NAS message (e.g., Service Request). The WTRU may indicate that, for the concerned PDU session ID, the PDU session may be changed to a (e.g., normal) single-access PDU session. If the special format of PDU session ID is used to indicate the single-access or multi-access choice, the WTRU may change one or more bits in the PDU session ID and/or may include the new PDU session ID in the message. The NW may be able to relate the new PDU session ID to the existing multi-access PDU session ID and/or may understand the WTRU's request to make the PDU session to a single-access PDU session.

Figure 10:
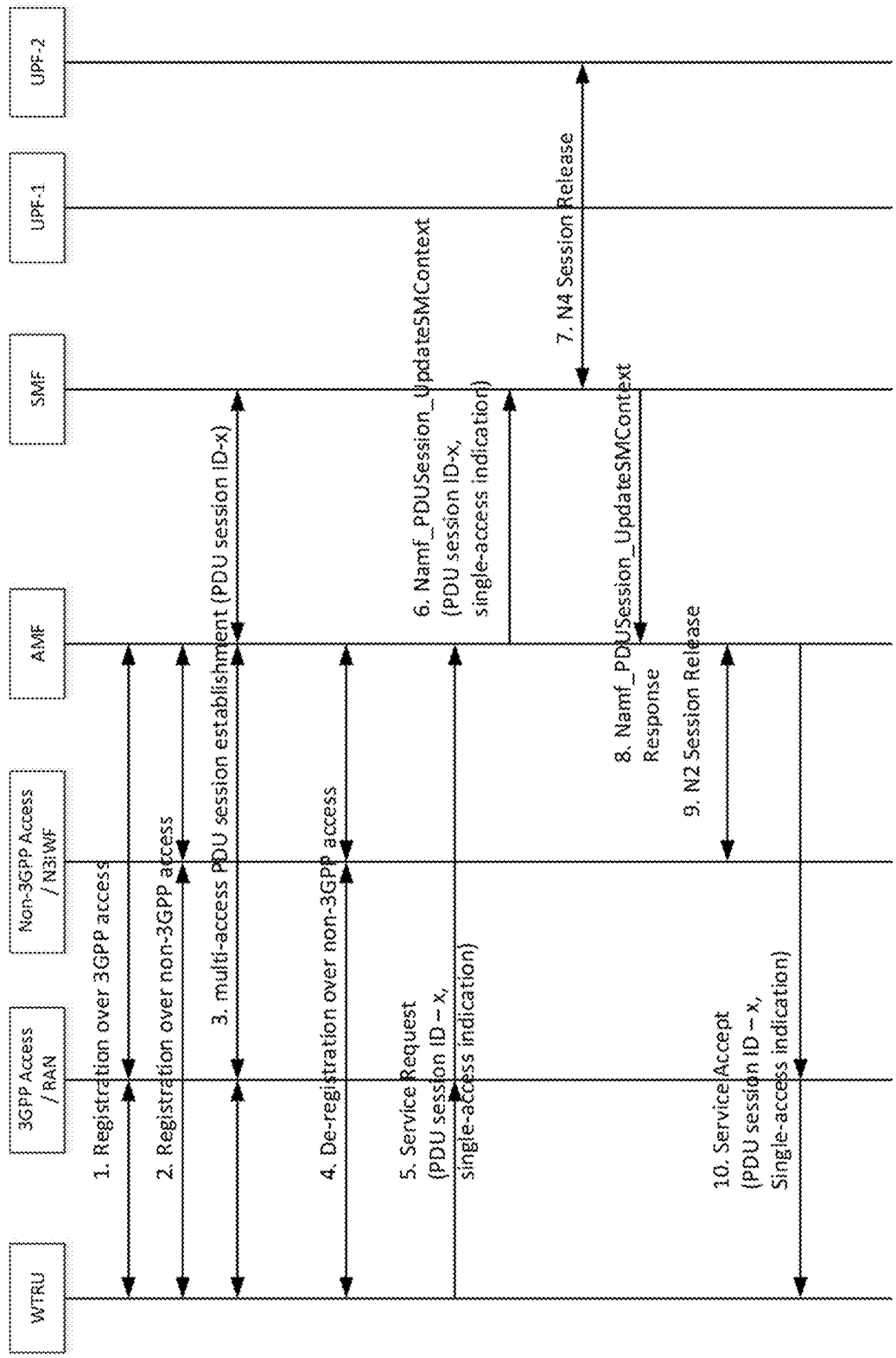
FIG. 10 illustrates an example WTRU requested PDU session modification from multi-access to single-access.

FIG. 10 illustrates an example WTRU requested PDU session modification from multi-access to single-access. The numbers shown in FIG. 10 may be presented for the purpose of reference. As such, the numbered actions may be performed in a different order (e.g., in whole or in part) and/or may be skipped.

The WTRU may be registered (e.g., successfully) to the 5G core over a 3GPP access network (e.g., element 1 shown in FIG. 10).

The WTRU may be registered (e.g., successfully) to the 5G core over a non-3GPP access network (e.g., element 2 shown in FIG. 10).

The WTRU may establish a multi-access PDU session over 3GPP access and/or non-3GPP access (e.g., element 3 shown in FIG. 10).

The WTRU may deregister over the non-3GPP access network (e.g., element 4 shown in FIG. 10).

The WTRU may enter Connected mode over 3GPP access work and may send a NAS Service Request to the AMF (e.g., element 5 shown in FIG. 10). The request may include a list of PDU session IDs that the WTRU wishes to activate. The list may include the previously established multi-access PDU session ID. The WTRU may have deregistered over non-3GPP access. The WTRU may indicate, in the request, that the WTRU may be modified to a single-access PDU session.

The AMF may invoke a Namf_PDUSession_UpdateSM-Context service of the SMF to modify the PDU session (e.g., element 6 shown in FIG. 10), for example when the AMF receives the Service Request and recognizes that a previously multi-access PDU session needs to be modified to a single-access PDU session. The AMF may pass the PDU session ID, the single-access indication, and/or other necessary information to the SMF.

The serving SMF may initiate N4 session release with the UPF that is connecting the non-3GPP access network (e.g., element 7 shown in FIG. 10).

The serving SMF may return a Namf_PDUSession_UpdateSMContext Response to the AMF and may confirm that PDU session modification has been completed (e.g., element 8 shown in FIG. 10).

The AMF may initiate the N2 session release towards the N3IWF (e.g., element 9 shown in FIG. 10).

The AMF may return a NAS message Service Accept to the WTRU confirming that the PDU session has been modified to single-access PDU session (e.g., element 10 shown in FIG. 10).

A NW may initiate the change for an existing multi-access PDU session to be a single-access PDU session. The NW may initiate the change when one or more of the following situation occurs. The NW may initiate the change when the WTRU's subscription data changes and where multi-access PDU session is not allowed for the WTRU. The NW may initiate the change when the WTRU's serving AMF or SMF changes and the new AMF and/or SMF does not support a multi-access PDU. The NW may initiate the change when the NW observes abnormalities on the connections to the secondary access network (e.g., congestion, data loss, and/or the like).

The NW may send a session management signaling to the WTRU, for example when the NW determines to remove the secondary access from a PDU session and the WTRU is in Connected mode over the master access network. The NW may include the PDU session ID and/or an indication that the PDU session is not intended for multiple accesses. The NW may use a new PDU session ID. For example, the NW may use a new PDU session ID by changing one or more bits that indicate the single-access/multi-access choice in the old PDU session ID. The WTRU may be able to relate the change to the old PDU session ID.

The NW may wait until the WTRU enters Connected mode, for example if the WTRU is in IDLE mode. If the WTRU includes the multi-access PDU session ID in the session list to be activated, the NW may indicate in the response message (e.g., Service Accept) that the multi-access PDU session has been changed to a single-access PDU session. The response message may indicate that the multi-access PDU session includes the new PDU session ID for single-access in the response message.

One or more network entities may be configured to provide a WTRU with a 5G access traffic steering policy. One or more of the following may be provided: steering policy provisioning, an S-NSSAI or DNN based steering policy, and/or a QoS based traffic steering policy. A WTRU (e.g., 5G WTRU) may be allowed to steer traffic to different access networks over which the WTRU has successfully registered. The WTRU may be provisioned with one or more policies and/or rules for steering traffic between multiple registered access networks. When the WTRU registers over multiple access networks to the 5G core, the WTRU may assume that the WTRU is served by the same AMF. The AMF may maintain a registration state and/or access specific context for each access network.

The AMF may establish traffic steering policies when a WTRU has successfully registered over two or more access networks. For example, the WTRU may be already registered over 3GPP access to the 5G core. The WTRU may initiate a new registration over non-3GPP access. When the WTRU successfully registers over non-3GPP access, the AMF may determine that a traffic steering policy is needed for the WTRU. The traffic steering policies may include one or more of the following: a set of S-NSSAIs, a set of DNNs, a set of application filters (e.g., IP tuples), and/or a set of QoS parameters (e.g., QFI, 5QI, allocation and retention priority (ARP), and/or the like or the combination of the QoS parameters).

Traffic steering policies may include a set of S-NSSAIs. For a set of S-NSSAIs and/or for each S-NSSAI, a target access network may be assigned. Priorities of each registered access network may be provided. The set of S-NSSAIs may be a part of or the whole of the allowed NSSAI.

Traffic steering policies may include a set of DNNs. For a set of DNNs and/or for each DNN, a target access network may be assigned. Priorities of each registered access network may be provided. For a set of combinations of S-NSSAIs and DNNs and/or for each combination of S-NSSAIs and DNNs, a target access network may be assigned. Priorities of each registered access network may be provided.

Traffic steering policies may include a set of application filters. For a set of application filters (e.g., IP tuples) and/or for each application filter, a target access network may be assigned. Priorities of each registered access network may be provided.

Traffic steering policies may include a set of QoS parameters. For a set of QoS parameters (e.g., 5QI, ARP, and/or the like or the combination of the QoS parameters) and/or for each set of QoS parameters, a target access network may be assigned. Priorities of each registered access network may be provided.

The AMF may query WTRU subscription data and other policy control functions. For example, the AMF may query the WTRU subscription data and the other policy control function to make up a traffic steering policy. The available steering policy may be returned to the WTRU over the secondary access, e.g., during a registration over the secondary access. The available steering policy may be sent to the WTRU over the master access, e.g. if the WTRU is in Connected mode over the master access, in an appropriate NAS message (e.g., WTRU Configuration Update). The NW may wait until the WTRU enters Connected mode over the master access and may send the policy in an appropriate NAS message (e.g., Service Accept).

The WTRU may request a traffic steering policy, e.g. when the WTRU has registered over multiple accesses. The WTRU may send the request in a separate NAS message. The WTRU may combine the request with other NAS messages and/or procedures (e.g., Service Request). The NW may make up the steering policy upon the request from the WTRU and may return the steering policy to the WTRU in appropriate NAS messages.

A WTRU may register to one or more access networks. The access networks may include a 3GPP access network and/or a non-3GPP access network. The WTRU may determine whether a multi-access PDU session or a single-access PDU session is available. The WTRU may establish a PDU session (e.g., single-access PDU session or multi-access PDU session) based on the determined availability. The WTRU may determine a traffic steering decision based on a traffic steering policy for the PDU session. The traffic steering policy may include one or more of the following: a set of S-NSSAI, a set of DNNs, a set of application filters, and a set of QoS parameters. The WTRU may transmit data over the access network using the established PDU session.

Figure 11:
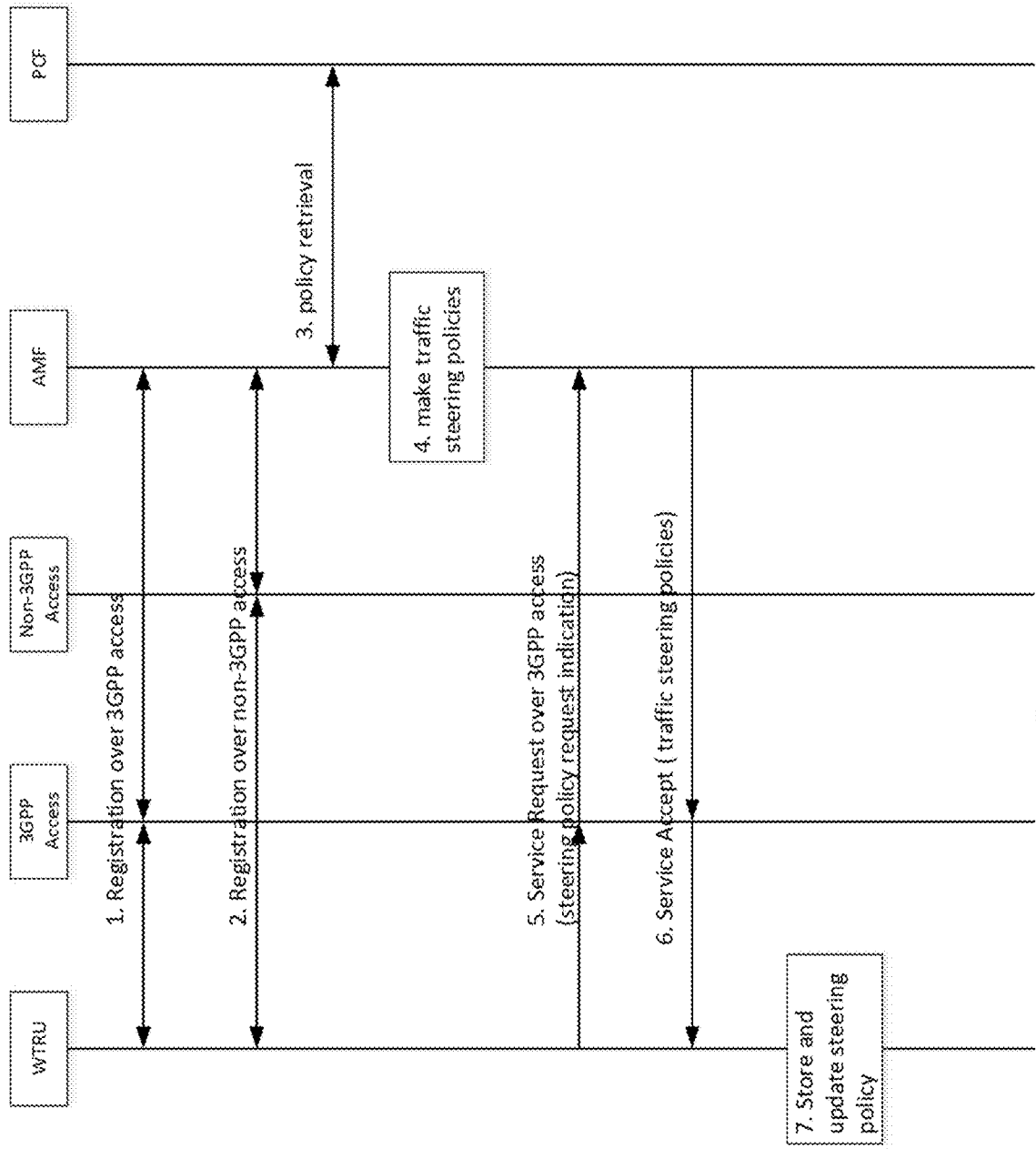
FIG. 11 illustrates an example of traffic steering policy provisioning.

FIG. 11 illustrates an example of traffic steering policy provisioning. The numbers shown in FIG. 11 may be presented for the purpose of reference. As such, the numbered actions may be performed in a different order (e.g., in whole or in part) and/or may be skipped.

A WTRU may be registered (e.g., successfully) to the 5G core over 3GPP access network (e.g., element 1 shown in FIG. 11).

The WTRU may be registered (e.g., successfully) to the 5G core over non-3GPP access network (e.g., element 2 shown in FIG. 11). The WTRU may be registered over one or more access networks. The WTRU may configure an AMF to prepare access traffic steering policies.

The AMF may retrieve policy information from a policy control function (PCF) (e.g., element 3 shown in FIG. 11).

The AMF may determine and/or configure one or more traffic steering policies for the WTRU (e.g., element 4 shown in FIG. 11). For example, the AMF may make one or more traffic steering policies based on, for example, registered access network information, WTRU subscription data, PCF provided policy information, and/or local configurations. The AMF may postpone this element, e.g. until the WTRU requests the policy (e.g., as shown in element 5 in FIG. 11).

The WTRU may send a request (e.g., Service Request) to the AMF. For example, the WTRU may include a steering policy request indication in Service Request or other NAS messages (e.g., such as Registration Update) over 3GPP access or non-3GPP access (e.g., element 5 shown in FIG. 11).

The NW may return the available steering policies to the WTRU in a Service Accept message or other appropriate NAS message, for example when the NW (e.g., AMF) receives the policy request indication. The NW may return the policy to the WTRU without an explicit request indication (e.g., element 6 in FIG. 11).

The WTRU may store and/or update the traffic steering policies (e.g., element 7 shown in FIG. 11).

A serving SMF (e.g., instead of AMF) may take the responsibility for providing steering policies for PDU sessions, for example if the WTRU is served by the same SMF over one or more access networks for a PDU session or a set of PDU sessions. The steering policy may be associated with a set of PDU sessions or a set of S-NSSAIs served by the SMF, e.g. if the serving SMF provides steering policies to the PDU sessions.

The WTRU may store the received steering policy. The WTRU may store multiple steering policies for multiple registered PLMNs (e.g., with each steering policy applying to a PLMN). If a steering policy (e.g., old steering policy) is stored in the WTRU, the received policy (e.g., newly received policy) may override the stored policy.

The WTRU may consider the one or more stored access traffic steering policies inactive, for example when the WTRU has deregistered from the master access or when the WTRU has deregistered from the secondary access and is left with a registered access (e.g., single restricted access). The WTRU may re-activate the one or more stored steering policies or may receive a new policy from the network, e.g., to replace the old policy, for example if the WTRU becomes registered with multiple access networks.

The WTRU may request the use of traffic steering from the AMF. The WTRU may inform the AMF that the WTRU supports traffic steering. In examples, the WTRU may inform the AMF that the WTRU supports traffic steering based on one or more NAS messages. The NAS messages may be registration messages or other messages. The NAS messages may be defined to be used as transition of the WTRU to connected mode or when the WTRU is in connected mode. The WTRU may retrieve the steering policy from the SMF as described herein. One or more example NAS messages may be used by the WTRU to receive the policies from the SMF. The NAS SM message may be encapsulated in a MM message and may be sent to the AMF. The WTRU may identify the PDU session ID, slice ID (e.g., S-NSSAI), and/or DNN/access point name (APN) or list of applications, services, etc., to which the request is related. The WTRU may include the access technologies over which steering may be done. This information may be included in the MM and/or SM messages. If the WTRU has multiple PDU sessions, the WTRU may send this message multiple times. The WTRU may piggyback more than one SM messages in an MM message and may identify the appropriate/corresponding PDU session for each SM component. An identified PDU session may help the AMF route the SMF message to the correct SMF, e.g., in cases of slicing with the WTRU having multiple different slice connections or multiple PDU sessions to different SMFs.

The AMF may receive a message that contains one or more SM messages with information identifying the PDU session which one or more SMFs and SM messages are intended for. The AMF may store the indication that the WTRU supports traffic steering. Based on the indication, the AMF may forward at least one SM message to the associated SMF, e.g., based on a PDU session ID, S-NSSAI, and/or the like. The AMF may receive a message from the SMF to forward to the WTRU, and the AMF may encapsulate this message in an MM message. The AMF may include a traffic steering indication in the MM message. The traffic steering indication may imply the network's desire to use steering, or that the related SM message is about traffic steering. The AMF may wait for at least one SMF to send corresponding SM messages, and the AMF may include an SM message in a MM message sent to the WTRU.

The SMF may receive a message from a WTRU (e.g., via the AMF) including an indication and/or a request for traffic steering across different access technologies. The message may include one or more supported accesses at the WTRU. The SMF may verify the local policies or subscription information. The SMF may contact the policy control function (PCF) to receive the traffic steering rules for the WTRU. The SMF may determine the steering rules and may send the rules in an SM message towards the WTRU, e.g., via the AMF. The SMF may include the PDU information to which the rules are related.

A WTRU may receive policies or rules that indicate if the WTRU is allowed to perform steering of traffic, from one source access type (e.g., 5G NR) to a target access type (e.g., WiFi), when the WTRU is in a forbidden area, a non-allowed area, or an allowed area. There may be one rule per one or more of the areas. For example, the WTRU may register over the 5G system and may be provided with a list of allowed areas, forbidden areas, and/or non-allowed areas. The WTRU may be provided with indications to perform (e.g., or not perform) traffic steering when the WTRU enters one or more of the areas. The WTRU may be provided with flows, PDU sessions, applications, and/or the like that may be subject to the steering. For example, when the WTRU enters a forbidden area (e.g., an area in which the WTRU is not allowed to send a signaling or data) the WTRU may verify if traffic steering is applicable in the area. The WTRU may, when data is available for transmission, verify if the flow is subject to steering in the area, e.g. if traffic steering is applicable in the area. The WTRU may send the flow over a non-3GPP access technology, e.g., WiFi, for example if the flow is subject to steering in this area. When the WTRU enters another area (e.g., a non-allowed area from the forbidden area), the WTRU may use the policies and/or rules for steering that correspond to that area.

The WTRU may be configured with one or more triggers to initiate ATSSS. The WTRU may monitor for one or more configured events and/or triggers. The WTRU may initiate ATSSS when a certain number of measurements have been configured in the WTRU for intra-handover and/or inter-handover, or for intra-RAT and/or inter-RAT measurements. The WTRU may initiate ATSSS when the WTRU receives a backoff indication or timer over a system. For example, the WTRU may steer certain traffic over a non-3GPP access when it receives a backoff indication or timer from the 5G system (e.g., via broadcast messages, or from the AMF and/or SMF).

The WTRU may be configured with rules and/or policies by the AMF, SMF, or N3IWF, for which the triggers may be applicable. In examples, the WTRU may apply the triggers to one or more (e.g., all) flows or one or more (e.g., all) data associated with one or more PDU sessions, or to data associated with one or more particular applications or DNNs.

The network may have triggers for ATSSS in the downlink. For example, the UPF may be configured, e.g., by the SMF, to send traffic to a N3IWF for a WTRU that is in idle mode, and for which downlink data notification has not been initiated when a DL data arrives. As such, the UPF may steer one or more packets over a non-3GPP access, e.g., by sending the data to a N3IWF.

The SMF may provide a UPF with policies and/or rules for which some triggers (as described herein) apply. For example, based on subscription information and/or local policies at the SMF, the SMF may configure a UPF over the N4 interface to steer data over an alternate access technology or via a different node (e.g., N3IWF) when the UPF receives data (e.g., that matches a specific flow or that is associated with a particular PDU session or DNN) for a WTRU that is in idle mode, and when the UPF has a tunnel set up with, e.g., a N3IWF.

Figure 12:
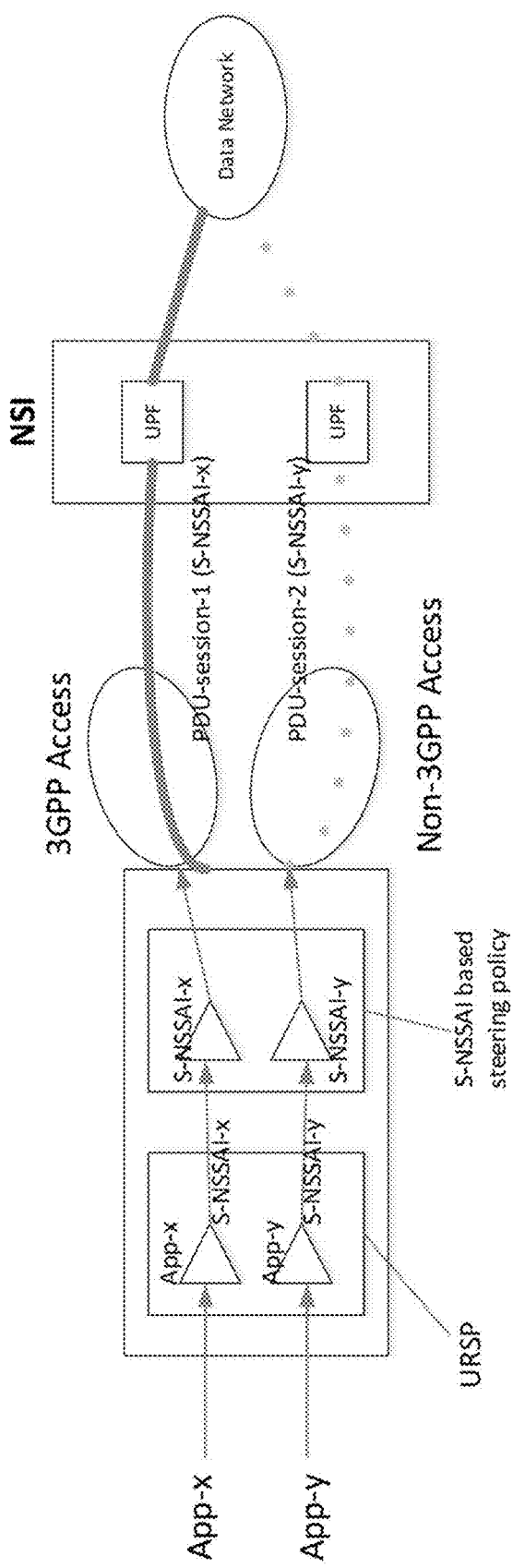
FIG. 12 illustrates an example access traffic steering using S-NSSAI based steering policy.

FIG. 12 illustrates an example of access traffic steering using an S-NSSAI based steering policy. A WTRU may be configured to use an S-NSSAI or DNN based steering policy. A WTRU may use a configured Network Slice Selection Policy (NSSP) or WTRU Route Selection Policy (URSP) to derive a target S-NSSAI and/or target DNN for application traffic, e.g. when an application initiates data request at the WTRU.

The WTRU may invoke the steering policy to locate the target access for the initiating application, e.g. if the WTRU is registered over multiple access networks and the stored access traffic steering policy is available and/or active.

A WTRU may apply a rule for the combination of S-NSSAI and DNN to locate a target access network, e.g. when the target S-NSSAI information and the target DNN are available and the steering policy contains a rule for the combination of S-NSSAI and DNN. The WTRU may apply a rule for a target S-NSSAI to locate the target access network, e.g. when the target S-NSSAI information and the target DNN are available, and the steering policy does not contain a rule for the combination of S-NSSAI and DNN, but has the rule for the target S-NSSAI. The WTRU may apply a rule for a target DNN to locate the target access network, e.g. when the target S-NSSAI information and the target DNN are available, and the steering policy does not contain the rule for the combination of S-NSSAI and DNN and does not have the rule for the target S-NSSAI, but has the rule for the target DNN.

For the case where the target S-NSSAI information and the target DNN are available and the steering policy does not contain the rule for the combination of S-NSSAI and DNN and does not have the rule for the target S-NSSAI or target DNN, but has the rule for the application filter, the WTRU may apply the rule for the application filter to locate the target access network.

A WTRU may apply a rule for a target S-NSSAI to locate a target access network, e.g., when target S-NSSAI information is available (e.g., DNN information is not available) and the steering policy contains the rule for the target S-NSSAI. The WTRU may apply a rule for the application filter to locate the target access network, e.g. when the target S-NSSAI information is available (e.g., DNN information is not available) and the steering policy does not have the rule for the target S-NSSAI, but has the rule for the application filter.

A WTRU may apply a rule for a target DNN to locate a target access network, e.g. when target DNN information is available (e.g., S-NSSAI information is not available) and the steering policy contains the rule for the target DNN. The WTRU may apply a rule for the application filter to locate the target access network, e.g. when the target DNN information is available (e.g., S-NSSAI information is not available) and the steering policy does not have the rule for the target DNN, but has the rule for the application filter.

A WTRU may steer application traffic to an existing PDU session, e.g. when the target access has been selected and the PDU session for the target S-NSSAI has been established over the target access. The WTRU may initiate the establishment of a PDU session over the target access network, e.g. if there is no existing PDU session for the target S-NSSAI over the target access. The URSP may contain one or more access selection rules. The access selection rules in the URSP may be overridden or ignored, e.g. if a separate access steering policy is available.

A WTRU may be configured to use a QoS based traffic steering policy. The WTRU may have two or more PDU sessions. For example, the WTRU may have two PDU sessions with each PDU session over a different access network. The WTRU may have two PDU sessions with each PDU session over a different access network and for the same S-NSSAI. The WTRU may have a multiple-access PDU session over two or more access networks. When the WTRU has two or more PDU sessions and/or the WTRU has a multiple-access PDU session over two or more access networks, the WTRU may invoke the QoS based steering policies to determine the target access network as described herein.

Figure 13:
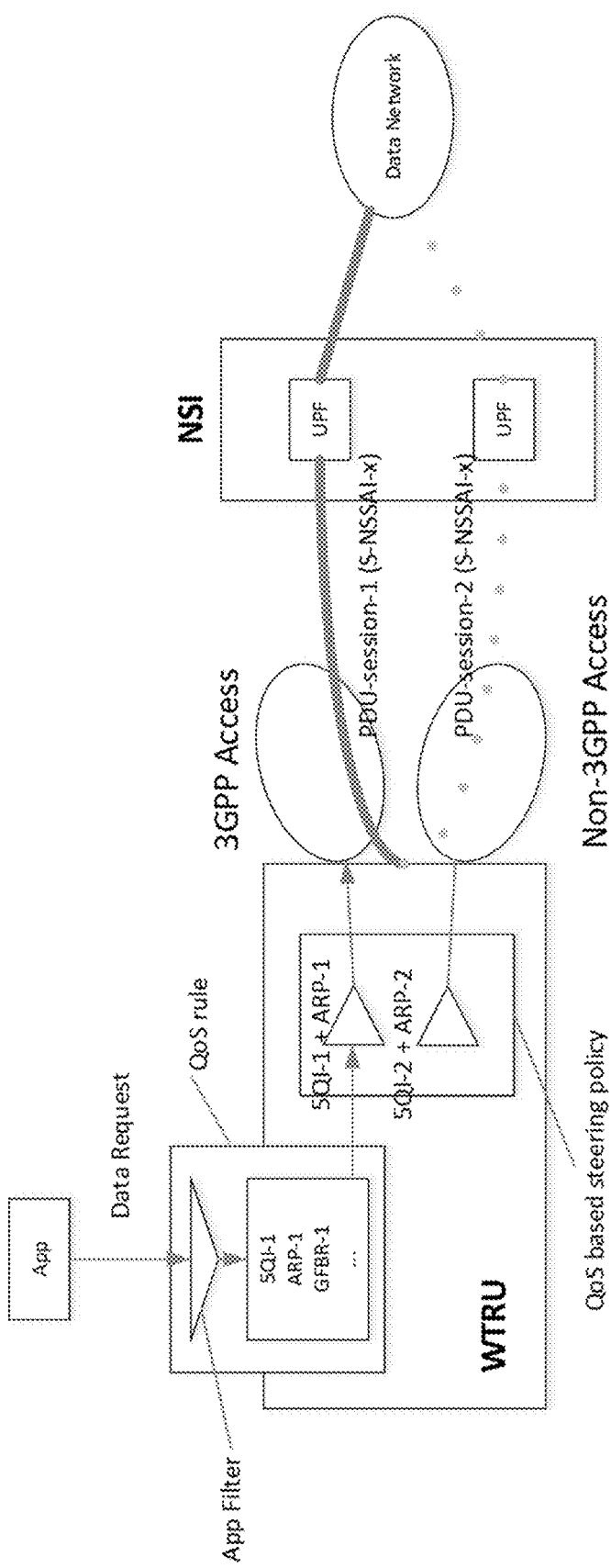
FIG. 13 illustrates an example access traffic steering using QoS-based steering policy.

The WTRU may derive target QoS parameters from a QoS rule, such as 5QI, ARP, UL/DL Guaranteed Flow Bit Rate, and/or the like, e.g. when an application initiates a data request at the WTRU and there is a configured QoS rule for the application. The WTRU may apply a (e.g., default) QoS rule for the application and may receive a set of (e.g., default) target QoS parameters, e.g. if there is no configured QoS rule for the application. The WTRU may apply a QoS-based rule to locate the target access, e.g. if the WTRU has been registered over multiple access and there is a QoS-based rule in the traffic steering policy. FIG. 13 illustrates an example access traffic steering using QoS-based steering policy.

As shown in FIG. 13, a WTRU may establish two PDU sessions (e.g., PDU-session-1 and PDU-session-2) through a 3GPP access network and a non-3GPP access network respectively. Both PDU sessions may be for the same S-NSSAI (e.g., S-NSSAI-x) and may be connected to the same data network. When an application initiates a data request, the WTRU may derive a set of QoS parameters (e.g., 5QI-1, ARP-1, GFBR-1, and/or the like) by applying a configured QoS rule. The WTRU may apply a traffic steering policy and may find an entry for the combination of 5QI-1+ARP-1, which may indicate that the traffic should be directed to 3GPP access. The WTRU may steer the traffic of the application to the PDU-session-1.

A WTRU may obtain rules that may indicate a set of QFIs for which the associated QoS rules are subject to steering. The rules may be based on QFI. For example, the rules may be based on QFI such that when the WTRU checks its QoS flows against packet filters, the WTRU verifies if the QFI associated with the rule is subject to offload steering. The rules may include access technology information that determines which access to use. The rules may be used by the WTRU to determine which access to use for the particular flow with a QFI that is subject to steering.

A WTRU may use reflective access use for traffic steering. Reflective access (RfA) may suggest the use of the same access technology to send (e.g., for uplink (UP) transmission) a particular flow (e.g., or set of flows) using the same access technology over which the WTRU received the flow (e.g., or set of flows) in the downlink (DL). In examples, the use of RfA may be per flow. In examples, the use of RfA may apply to one or more (e.g., all) flows that are associated with a PDU session. In examples, the use of RfA may apply to one or more (e.g., all) types of traffic, e.g., IP, non-IP, structured, non-structured, and/or the like.

The WTRU may indicate its support for RfA when it registers with the network or when it establishes a PDU connection and/or session. The indication may be included in MM and/or SM messages. For example, the WTRU may request or indicate the support of RfA when the WTRU sends one or more SM messages to establish a new PDU session and/or to modify an existing one.

The WTRU may be configured with a timer (e.g., default timer) during which the WTRU may apply RfA. The timer (e.g., which may be referred to as RfAT) may be provided per flow. The WTRU may apply a RfAT value (e.g., default RfAT) for one or more (e.g., all) flows, e.g. if the timer is not provided per flow. The WTRU may receive a default or flow-specific RfAT from the SMF or the AMF. For example, the RfAT may be received by the WTRU using SM and/or MM messages, respectively.

The SMF (e.g., and/or AMF) may have rules and/or policies that are local and that may determine which flows are subject to RfA. The SMF may obtain the rules from a PCC/PCF or a home subscriber server (HSS) and/or user data management (UDM). The SMF may have a default flow-specific RfAT that may be provided to the WTRU in an existing message. For example, a message may include one or more messages used for PDU establishment or modification. In examples, new SM or MM messages may be used to carry the default flow specific RfAT information. The SMF may provide the rules, for which certain QoS flows are subject to RfA, to the WTRU in one or more SM messages.

When the WTRU receives a flow in the DL, the WTRU may verify its rules for RfA to determine if the same flow, in the UL direction, is subject to RfA. The WTRU may associate the RfAT with the flow, e.g. if the flow is received for the first time in the DL. The RfAT value may be set as described herein. The WTRU may save the access technology over which the flow is received. The WTRU may verify, for new flows to be sent in the UL, the access technology that is used for the flow in question, e.g. while the timer is running for a particular flow (e.g., or sets of flows or one or more (e.g., all) data associated with a PDU session). The WTRU may use a default access technology and/or configured rules to send the data using a particular access technology, e.g. if no match is found or if the flow that matches has no RfAT running or no RfAT is associated with the flow. The WTRU may use the access technology associated with the flows for which an RfAT is running until the RfAT expires. The RfA indication received from the network may override one or more (e.g., all) rules (e.g., rules that may be based on RfA) that may be preconfigured in the WTRU.

Figure 14:
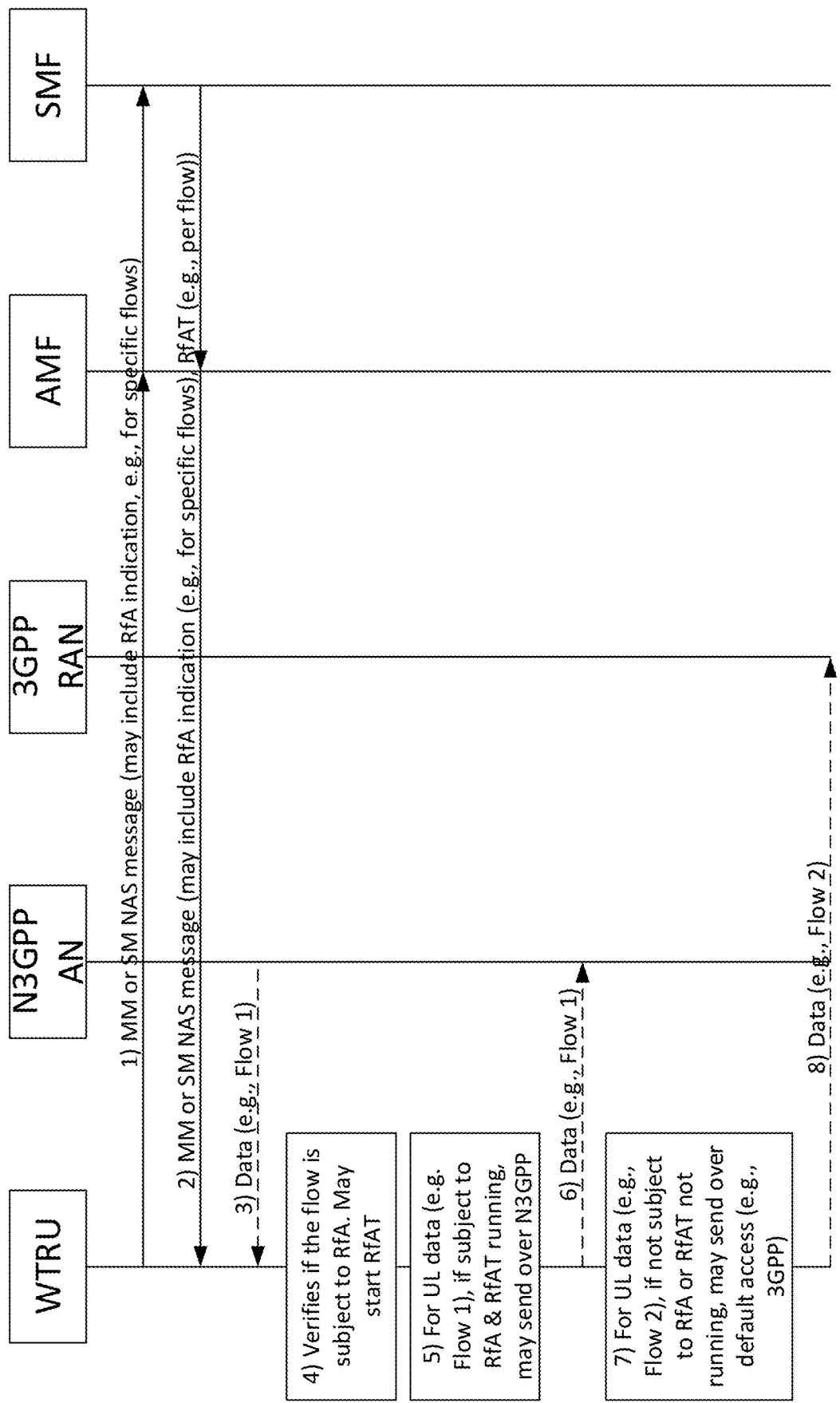
FIG. 14 illustrates an example call flow for reflective access use for traffic steering.

FIG. 14 illustrates an example call flow for reflective access use for traffic steering.

The WTRU may send a reflective access indication to the NW during registration. The indication may indicate that the WTRU is capable of using different access networks for UL and DL, respectively. The indication may inform the network that the WTRU is capable of using a reflective access feature.

A WTRU may be configured to perform slice selection and management over non-3GPP access. For example, A WTRU may use an access specific NSSAI. A (e.g., 5G) WTRU's configured S-NSSAIs may be access network specific, for example to support slice selection over multiple access networks. An S-NSSAI may be labeled for a 3GPP access network and/or for non-3GPP access.

When the WTRU performs registration over an access network, e.g., 3GPP access, the WTRU may construct the requested NSSAI from the configured S-NSSAIs for the particular type of access and/or the configured S-NSSAIs for both access networks (e.g., 3GPP and non-3GPP access networks).

A WTRU may receive an allowed NSSAI from the network that may be access network specific. The network may label (e.g., explicitly label) that the S-NSSAI is allowed for 3GPP access, non-3GPP access, or both. The WTRU may (e.g., implicitly) consider that the allowed S-NSSAI may be allowed for the access network over which the allowed S-NSSAI is received, e.g. if the network does not label (e.g., explicitly label) the S-NSSAI. The WTRU may (e.g., implicitly) consider that the S-NSSAI may be allowed for both access networks, e.g. when the network does not label (e.g., explicitly label) the S-NSSAI. The WTRU may store related access network information for each allowed S-NSSAI. The NW may label the allowed NSSAI for different access networks. The WTRU may indicate in a registration message that the WTRU is capable of or may access NSIs over multiple access networks.

A WTRU may construct a requested NSSAI from allowed S-NSSAIs for a particular type of access and/or allowed S-NSSAIs for both access networks, e.g. when the WTRU performs registration over an access network, and the WTRU has stored allowed NSSAI.

Figure 15:
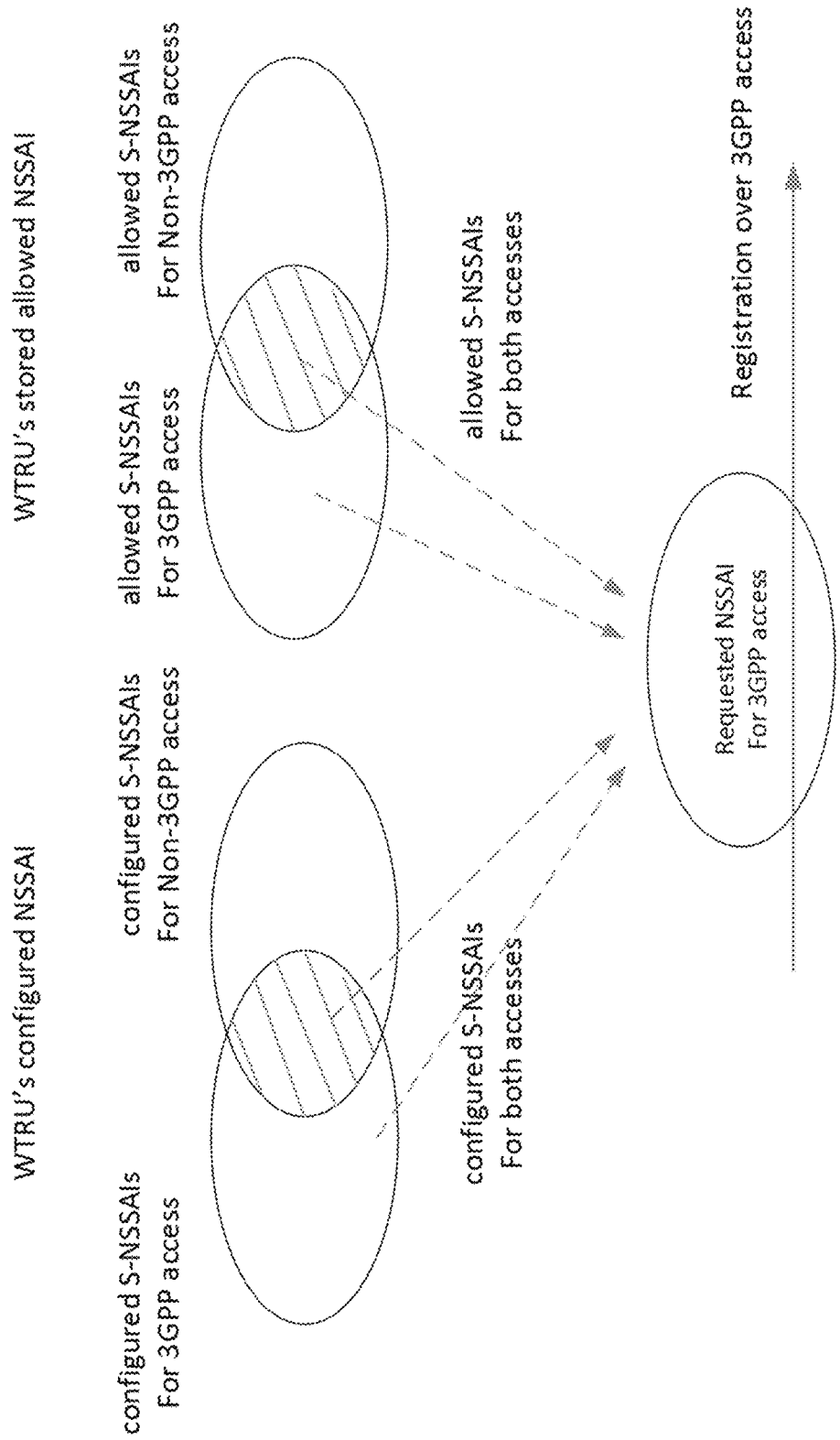
FIG. 15 illustrates an example of how requested NSSAI may be constructed by access-specific NSSAIs.

FIG. 15 illustrates an example of how a requested NSSAI may be constructed by access-specific NSSAIs. In FIG. 15, the WTRU may have an access specific configured NSSAI and an access specific allowed NSSAI. The WTRU may construct the requested NSSAI from the configured S-NSSAIs for 3GPP access or for both accesses, and/or from the stored allowed S-NSSAIs for 3GPP access or for both accesses, e.g. when the WTRU performs registration over the 3GPP access network.

The WTRU's subscribed NSSAI may be labeled for a particular access network or for both (e.g., two or more) access networks.

If the WTRU has registered over an access network, e.g., 3GPP access, and the AMF has selected a serving NSI for the WTRU, the WTRU may initiate registration over another access, e.g., non-3GPP access. If the WTRU initiates registration over the other access, the WTRU may construct the requested NSSAI from the allowed S-NSSAIs that may be stored and/or received for the previous access network. The WTRU may choose one or more allowed S-NSSAIs that were labeled as allowed for both access networks. When the WTRU registers over the other access network, the WTRU may be served by the same AMF that has been selected for the pervious access network.

A WTRU may send a registration message for connection to an isolated slice on non-3GPP access, e.g. when the WTRU (e.g., based on provisioned slice coexistence rules) decides to establish a connection with a slice (e.g., isolated slice) which cannot coexist with the current set of slices that the WTRU is connected to. The temporary ID, e.g., the assigned 5G global unique temporary ID (GUTI), may not be included in the registration request message. The registration message may be routed to the isolated AMF. The WTRU may be able to connect to the isolated slice on the non-3GPP access without deactivating connections to the existing slices.

A WTRU may be configured to switch access networks based on available network slices.

A WTRU may establish PDU sessions with network slices over a 3GPP access network. The WTRU may move to a new registration area where the WTRU's available and/or allowed network slices may change, and the existing connected network slices may not be available. If this occurs, and if the WTRU is registered over non-3GPP access networks, the WTRU may check if the current connected network slices (e.g., over the 3GPP access network) are available over the non-3GPP access network, as there may be different sets of available network slices over different ANs. The WTRU may initiate switching the PDU sessions over the non-3GPP access network to the same network slices, e.g. if the slices are not available over 3GPP access but are available over non-3GPP access. The WTRU may begin to switch the data flows from 3GPP access to the PDU sessions over non-3GPP access, e.g. if the WTRU has established PDU sessions over non-3GPP access for the same network slices and DN.

The CN (e.g., AMF) may command the WTRU to switch the PDU sessions to other access network, e.g. when the CN determines (e.g., during registration) that some targeted NSIs are not available in the current access network.

A NW-provided QoS rule may be associated with one or more specific access network types. The NW may indicate (e.g., explicitly indicate) the access network types that are associated with the provided QoS rules. In examples, the access network types may include 3GPP access and/or non-3GPP access. In examples, the access network types may be more specific RAT types such as 5G NR, LTE, WLAN, and the like. The QoS rules may be applied for the associated access network types. The NW-provided QoS rule may be considered to be applicable to one or more (e.g., all) access networks, e.g. if the NW does not explicitly indicate the associated access network type for the QoS rule. The NW-provided QoS rule may be considered to be applicable to the access network over which the NAS signaling for the QoS rule configuration is received, e.g. if the NW does not explicitly indicate the associated access network type for the QoS rule.

For a service data flow, the NW may provide access specific QoS rules. For example, the NW may provide multiple QoS rules, each of which may be used for a specific access network type or RAT type. The NW may configure multiple access-specific QOS rules for the same service data flow during PDU session establishment, e.g., based on the knowledge that the data may be transferred over various access networks. For example, if the WTRU has registered over a 3GPP access network and a non-3GPP access network, or if the WTRU has indicated an intention to establish a multi-access PDU session, the SMF may determine to request access-specific QoS rules for the PDU session from the policy function and may provide the QoS rules to the WTRU. The policy function may determine the QoS rules to the WTRU (e.g., when the SMF does not request multiple access-specific QoS rules from the PCF). For example, the policy function may determine the QoS rules according to the WTRU's subscription or registration status, or whether to provide multiple access-specific QoS rules for the same service data flow (SDF).

The NW may provide (e.g., initially provide) the QoS rule for an access network during PDU session establishment and may provide additional QoS rules for other access networks (e.g., when necessary). In examples, when the WTRU has registered over another access network to the same PLMN, the network may configure additional QoS rules for the new access network, e.g., via the session management signaling. In examples, when the NW decides to switch the service data flow to the other access network, the NW may configure the new QoS rule for that access network if a QoS rule is not provided.

The NW may configure access specific default QoS rules for one or more access networks.

For the same service data flow, the QoS profile (e.g., 5QI, ARP, and other QoS parameters) and precedence value may be different between multiple access-specific QoS rules.

A reflective QoS rule (e.g., that may be derived by the WTRU according to one or more DL packets) may be associated with the access network over which DL packets are received. When the SDF has been switched to another access network, the WTRU may not use the existing reflective QoS rule for the new access network. When the SDF has been switched to the other access network, the WTRU may derive one or more new reflective QoS rules. In examples, the new reflective QoS rules may have a same or different QFI. In examples, the new reflective QoS rules may be according to the DL packets received over the new access network. The WTRU may apply the access-specific default QoS rule or access-specific NW-configured QoS rule for the new access network, e.g. if the WTRU sends UL data before a DL packet is received over the new access network after switching.

The WTRU may keep an old reflective QoS rule associated with an old access network, e.g. when the WTRU produces and applies a new reflective QoS rule for the SDF switched to another access network. The WTRU may use a readily available reflective QoS rule for the UL data, e.g. when the SDF is switched back to the old access network.

A NW may configure a different precedence value for the various access-specific QoS rules (e.g., including the NW-provided QoS rule and the reflective QoS rule). For the same SDF, the NW-provided QoS rule may have a higher priority over a reflective QoS flow on an access network, while the NW-provided QoS rule may have a lower priority than a reflective QoS flow on other access network.

Figure 16:
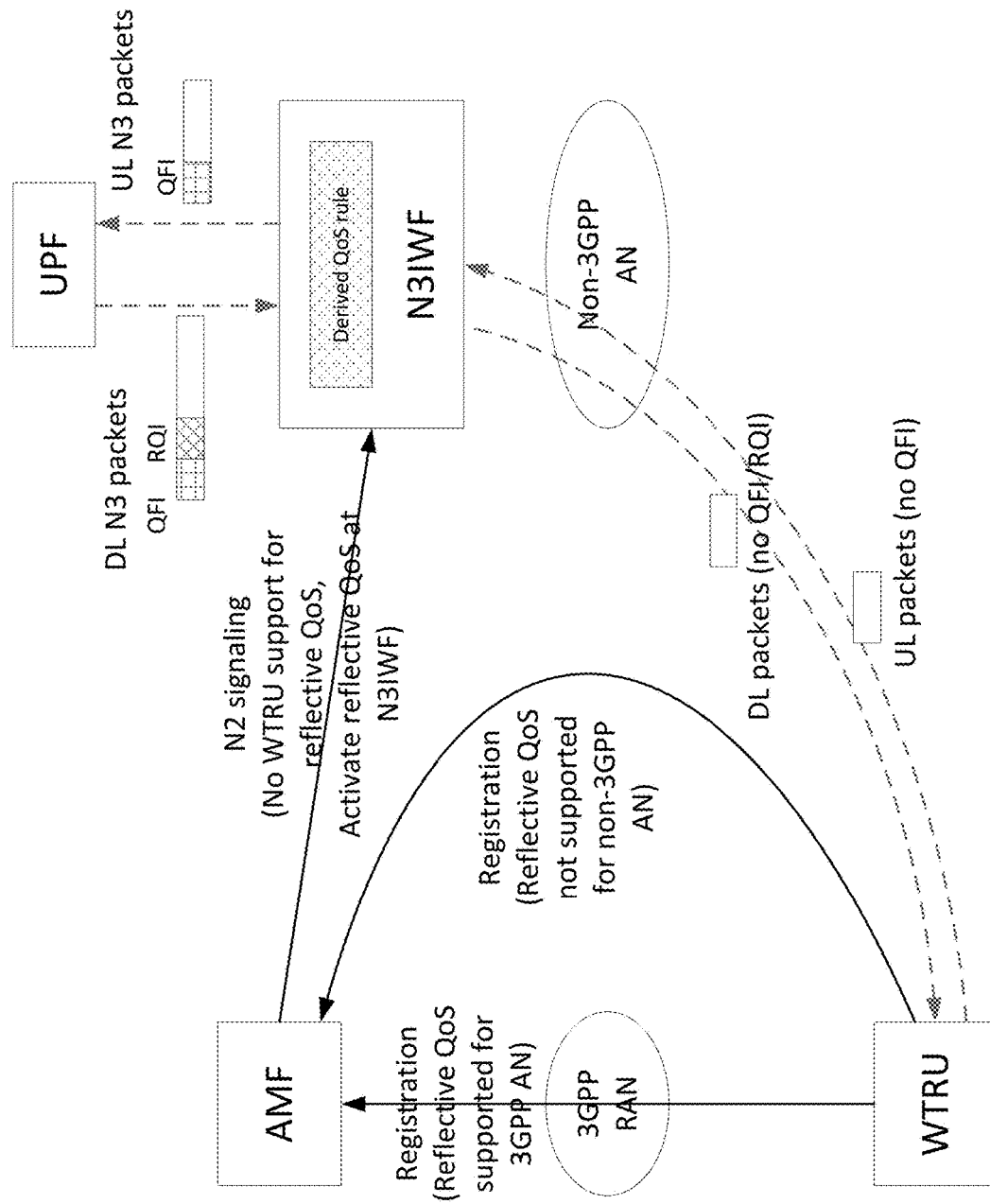
FIG. 16 illustrates an example reflective QoS enforcement at N3IWF.

FIG. 16 illustrates an example reflective QoS enforcement at N3IWF.

A WTRU may indicate to a NW whether it supports reflective QoS, e.g., during registration. The reflective QoS support indication may be access network specific. For example, the WTRU may indicate that the WTRU supports reflective QoS over a 3GPP access network and does not support reflective QoS over a non-3GPP access network. In examples, the reflective QoS support indications for various access networks may be sent together during registration over one type of access network (e.g., the support indications for 3GPP and/or non-3GPP access network may be sent during registration over the 3GPP access network). In examples, the reflective QoS support indications may be sent separately in a registration corresponding to the specific access network (e.g., the support indication for the 3GPP access network may be sent during registration over the 3GPP access network, and the support indication for non-3GPP access network may be sent during registration over the non-3GPP access network). The NW (e.g., AMF) may notify the corresponding N3IWF whether a WTRU supports reflective QoS or not, e.g., via N2 signaling. The N3IWF may decide whether or not the N3IWF may enforce reflective QoS rule for the WTRU based on the notification.

If the N3IWF receives the indication that the WTRU does not support reflective QoS over the non-3GPP access network, or the N3IWF does not support the pass-through of QFI/RQI over the non-3GPP access network (e.g., the N3IWF does not support the GRE extension to carry QFI/RQI in GRE header), the reflective QoS rule may be achieved by enforcing reflective QoS rule derivation and UL packet marking at N3IWF.

The enforcement of reflective QoS rule at the N3IWF may be activated (e.g., explicitly activated) or deactivated by the NW, e.g., via N2 signaling. The activation or deactivation of the reflective QoS function at the N3IWF may be per WTRU, per PDU session (e.g., per N3 tunnel), or per service data flow (e.g., the packet filer for the specific SDF may be configured). A reflective QoS timer may monitor the deactivation of reflective QoS in the DL packets and may be configured.

The N3IWF may monitor downlink N3 packets for the targeted WTRU, targeted PDU session, or SDF, e.g. if the reflective QoS function is activated at the N3IWF. For example, the N3IWF may monitor the downlink N3 packets to see if RQI is present in the N3 packet header. The N3IWF may create a new derived QoS rule with a packet filter corresponding to the DL packet and may start/restart the reflective QoS timer, e.g. when a DL packet (e.g., of the same data flow) with RQI is received and if the RQI is present and there is no N3IWF derived reflective QoS rule associated with the data flow. The N3IWF may remove the QFI and/or RQI from the N3 DL packets before forwarding them to the WTRU over the non-3GPP access network.

Upon receiving uplink packets from the WTRU, the N3IWF may determine whether there is a reflective QoS rule (e.g., which has the packet filter matched to the UL packets). If the N3IWF determines that there exists a reflective QoS rule, the N3IWF may mark the corresponding N3 tunnel packets with the QFI in the reflective QoS rule.

The termination of the reflective QoS rule may occur when a timer associated with the N3IWF derived QoS rule expires. the N3IWF may delete the corresponding derived QoS rule. The termination of the reflective QoS rule may occur when the NW deactivates the reflective QoS function at N3IWF, e.g., via N2 signaling.

The N3IWF, the AMF, or the SMF may decide not to use reflective QoS for at least one WTRU. The UPF may be connected to the N3IWF. The UPF may connect to the 5G RAN node that the WTRU is using at the same time. The UPF may apply RQI to some packets that are sent towards the 5G RAN node over the N3 interface.

An N3IWF node may decide not to apply reflective QoS for a set of WTRUs (e.g., or for a set of flows per WTRU). The N3IWF may inform the AMF that reflective QoS may no longer be applied for the set of WTRUs (e.g., or for a set of flows per WTRU). The N3IWF may provide an identity of the WTRUs to the AMF for which the use of reflective QoS may be stopped. The flow description per WTRU (e.g., that may be subject to this change) may be provided to the AMF. The same may be used to inform the AMF and/or SMF that reflective QoS may be applied for a set of WTRUs (e.g., or for a set of flows per WTRU), for which reflective QoS may not be currently used. The N3IWF may identify the UPF node and/or the tunnel ID. The tunnel ID may be established with the UPF over the N3 interface.

The AMF may receive a request or indication from an N3IWF about a change (e.g., stop or start) of use of reflective QoS for a set of WTRUs (e.g., or for a set of flows per WTRU). The AMF may acknowledge the receipt of the indication. The AMF may forward the indication or request to another network function, e.g., the SMF. The AMF may provide the identity or the tunnel ID of the N3IWF and the UPF to the SMF. The AMF may send an acknowledgement of the receipt of the message back to the N3IWF, e.g., after a response is received from the other network function (e.g. SMF) that the AMF has sent an indication to. The AMF may have policies that determine whether or not the request from the N3IWF is allowed for a set of WTRUs (e.g., or for a set of flows per WTRU).

The SMF may receive a request or indication for a change in the use of reflective QoS for a set of WTRUs (e.g., or for a set of flows per WTRU) from another network node (e.g., AMF or N3IWF). The SMF may verify its policies to determine if the request may be allowed for the WTRUs (e.g., or for a set of flows per WTRU). The SMF may receive the UPF identity and/or the tunnel ID with which the N3IWF connects to the UPF. If the request for a change (e.g., start or stop) of reflective QoS use is allowed, the SMF may send a request to the UPF and may inform the UPF about the change (e.g., start or stop) of reflective QoS use for a set of WTRUs (e.g., or for a set of flows per WTRU). The SMF may wait for a response from the UPF before replying to the AMF with the result of the request. The SMF may send the identity of the N3IWF to the UPF and/or the identity of the UPF to the N3IWF.

The UPF may receive a request to change (e.g., start or stop) the use of reflective QoS for a set of WTRUs (e.g., or for a set of flows per WTRU). The UPF may apply the change as requested and may reply with the result to the SMF.

When the N3IWF, the SMF, or AMF determines (e.g., autonomously determines) to change the use of reflective QoS, one or more implementations described herein may be used to enforce the desired change.

A single allowed NSSAI list may be maintained across multiple access networks. Network slices may be provided with PLMN scope. For example, a single allowed NSSAI list may be defined on a PLMN (e.g., or equivalent PLMN) basis. The same list may be used by the WTRU when accessing network service through one or more (e.g. any) network access types belonging to the same PLMN. A single AMF handling registration within a PLMN (e.g., or equivalent PLMN) may be used. The single AMF handling registration may be responsible for ensuring that even when multiple registration contexts are defined (i.e., one registration context per access network type), the allowed NSSAI list is valid for all of them. A single allowed NSSAI list may be sufficient for all contexts.

The AMF may provide a WTRU with a single allowed NSSAI list that contains all S-NSSAI for all applicable network access types. This may be accomplished by associating an network access type or access technology type attribute to every slice instance. In addition, the association of a network slice to a specific network access type, may be accomplished by binding the relevant tracking area to a particular network access type. A WTRU may derive the network access type by looking at the tracking area associated with the network slice. This is possible since in a 3GPP 5G system, non-3GPP accesses are defined on a single tracking area and this tracking area is distinct from any tracking area defined for 3GPP access network types.

Modifications to the list of S-NSSAIs within the allowed NSSAI may be performed, and may be triggered either by a WTRU or network. The allowed NSSAI list may be updated over the network access type where the modification is triggered, but may (e.g., may also) be valid for all access types valid on the same PLMN (e.g., or equivalent PLMN). For example, a WTRU that is simultaneously connected to both 3GPP and non-3GPP ANs may request the modification of the allowed NSSAI list during a registration over an access network of type "3GPP". Upon a successful registration (e.g., through the receipt of a registration accept message) the network may provide the WTRU with a new allowed NSSAI that is valid for both the 3GPP network access type and non-3GPP network access type.

A WTRU may receive a new allowed NSSAI list, and may apply the information contained in the allowed NSSAI list to determine which access types are suitable to establish one or more PDU sessions. A WTRU may determine whether established PDU sessions may be transferred across multiple network access types, for example, based on the information provided in the unique allowed NSSAI list (e.g., routing policies and NSSPs (Network Slice Selection Policies)).

A tracking area (TA) may be unique to a particular access network type (e.g., non-3GPP network access). A tracking area may be used to derive the applicability of an allowed NSSAI slice instance to the network access type associated to this tracking area. A TA (e.g., to which a network slice instance may be associated) may be used by the WTRU to determine whether a network slice instance is valid for a particular network access type. In an example, a network access type itself may be used as an attribute to qualify a network slice instance to be valid for a particular access type. As an example, slice elements contained within the allowed NSSAI list may be assigned with attributes resembling the following: Allowed NSSAI {NSSAI-1 (NSI ID, Access Type: "3GPP" (TA1, TA2 . . . TAn, NSSPs), Access Type: "Non-3GPP" (N3GPP TAI, NSSPs)).

Figure 17:
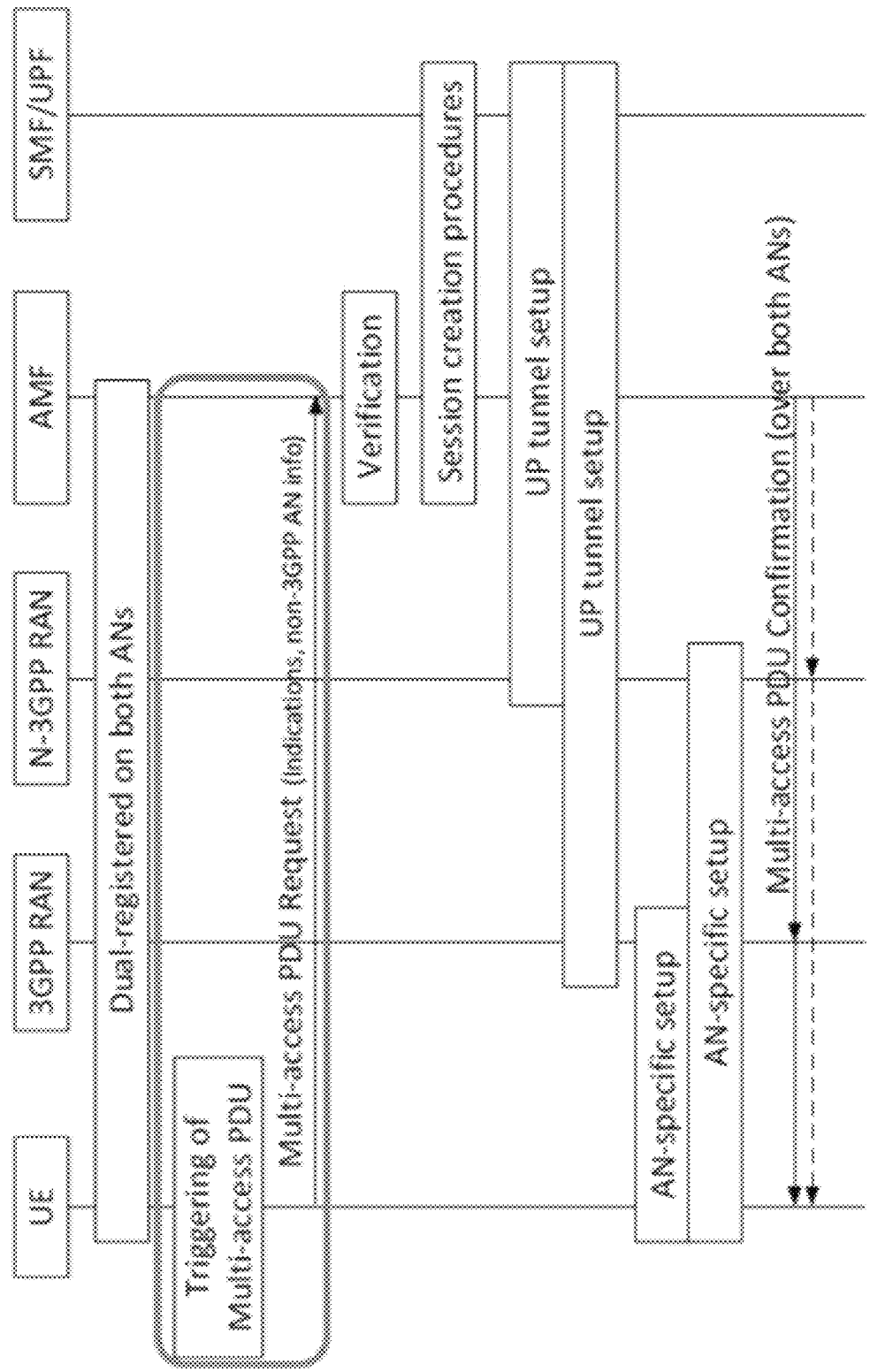
FIG. 17 illustrates an example of establishing a multi-access PDU session.

FIG. 17 illustrates an example of establishing a multi-access PDU session. A WTRU may be registered over two or more access networks (e.g., a 3GPP access network and a non-3GPP access network). A multi-access PDU session may be triggered on the WTRU, e.g. by an application running on the WTRU. The WTRU may send a multi-access PDU request to an AMF. The AMF may verify the request and may perform session creation with, e.g., an SMF and/or a UPF. The SMF may set up a UP tunnel with the two or more access networks. The WTRU may perform setup (e.g., access network-specific setup) with the two or more access networks. The AMF may send a confirmation message (e.g., a multi-access PDU confirmation message) to the WTRU. The confirmation message may be sent over multiple networks. The WTRU may receive the confirmation message and may send uplink data over the two or more access networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method implemented in a wireless transmit/receive unit (WTRU), the method comprising:
    sending a first request to a first access network, wherein the first request comprises an indication that the WTRU is requesting a protocol data unit (PDU) session and information indicating a PDU session ID;
    sending a second request to a second access network, wherein the second request comprises an indication that the WTRU is requesting a PDU session and information indicating the PDU session ID;
    responsive to the second request, receiving a message indicating that a multi-access PDU session has been established; and
    sending a first PDU associated with the multi-access PDU session over the first access network and sending a second PDU associated with the multi-access PDU session over the second access network.

2. The method of claim 1, wherein the multi-access PDU session is established based on at least one of the WTRU being registered with a 3rd Generation Partnership Project (3GPP) access network and a non-3GPP access network, or one or more configured policies in the WTRU indicating that multi-access is preferred.

3. The method of claim 1, further comprising:
receiving a policy indicating that multi-access is preferred; and
transmit the second request to a 3GPP access network based on the received policy.

4. The method of claim 1, wherein the method comprises:
receiving an allowed network slice selection assistance information (NSSAI) for an access type, the access type comprising a 3GPP access or a non-3GPP access;
storing the allowed NSSAI for the access type; and
on a condition that the WTRU receives a second allowed NSSAI for the access type, replacing the stored allowed NSSAI for the access type with the second allowed NSSAI for the access type.

5. The method of claim 4, wherein the allowed NSSAI comprises a plurality of allowed single-NSSAIs (S-NSSAIs), each of the plurality of allowed S-NSSAIs is valid for the access type that received the allowed S-NSSAI, and wherein the method further comprises storing the plurality of allowed S-NSSAIs for the access type.

6. The method of claim 1, wherein the method comprises:
receiving a first single network slice selection assistance information (S-NSSAI) for a 3GPP access network and a second S-NSSAI for a non-3GPP access network; and
determining whether to request the multi-access PDU session for a requested S-NSSAI based at least in part on whether the requested S-NSSAI is allowed for the 3GPP access network and the non-3GPP access network based on the first S-NSSAI for the 3GPP access network and the second S-NSSAI for the non-3GPP access network.

7. The method of claim 1, wherein the first access network is a 3GPP access network, and the second access network is a non-3GPP access network.

8. The method of claim 7, wherein the 3GPP access network and the non-3GPP access network are associated with a public land mobile network (PLMN).

9. The method of claim 1, further comprising:
receiving an indication in a NSSAI associated with the multi-access PDU session, wherein the indication indicates that the multi-access PDU session is allowed.

10. The method of claim 1, wherein the second request comprises a PDU session ID for the multi-access PDU session.

11. A wireless transmit/receive unit (WTRU) comprising:
a processor configured to:
send a first request to a first access network, wherein the first request comprises an indication that the WTRU is requesting a protocol data unit (PDU) session and information indicating a PDU session ID;
send a second request to a second access network, wherein the second request comprises an indication that the WTRU is requesting a PDU session and information indicating the PDU session ID;
responsive to the second request, receive a message indicating that a multi-access PDU session has been established; and
send a first PDU associated with the multi-access PDU session over the first access network and send a second PDU associated with the multi-access PDU session over the second access network.

12. The WTRU of claim 11, wherein the multi-access PDU session is established based on at least one of the WTRU being registered with a 3rd Generation Partnership Project (3GPP) access network and a non-3GPP access network, or one or more configured policies in the WTRU indicating that multi-access is preferred.

13. The WTRU of claim 11, wherein the processor is further configured to:
receive a policy indicating that multi-access is preferred; and
transmit the second request to a 3GPP access network based on the received policy.

14. The WTRU of claim 11, wherein the processor is configured to:
receive an allowed network slice selection assistance information (NSSAI) for an access type, the access type comprising at least one of a 3GPP access or a non-3GPP access;
store the allowed NSSAI for the access type; and
on a condition that the WTRU receives a second allowed NSSAI for the access type, replace the stored allowed NSSAI for the access type with the second allowed NSSAI for the access type.

15. The WTRU of claim 14, wherein the allowed NSSAI comprises a plurality of allowed single-NSSAIs (S-NSSAIs), each of the plurality of allowed S-NSSAIs is valid for the access type that received the allowed S-NSSAI, and wherein the method further comprises storing the plurality of allowed S-NSSAIs for the access type.

16. The WTRU of claim 11, wherein the processor is configured to:
receive a first single network slice selection assistance information (S-NSSAI) for a 3GPP access and a second S-NSSAI for a non-3GPP access; and
determine whether to request the multi-access PDU session for a requested S-NSSAI based at least in part on whether the requested S-NSSAI is allowed for the 3GPP access network and the non-3GPP access network based on the first S-NSSAI for the 3GPP access network and the second S-NSSAI for the non-3GPP access network.

17. The WTRU of claim 11, wherein the first access network is a 3GPP access network, and the second access network is a non-3GPP access network.

18. The WTRU of claim 17, wherein the 3GPP access network and the non-3GPP access network are associated with a public land mobile network (PLMN).

19. The WTRU of claim 11, wherein the processor is further configured to receive an indication in a NSSAI associated with the multi-access PDU session, wherein the indication indicates that the multi-access PDU session is allowed.

20. The WTRU of claim 11, wherein the second request comprises a PDU session ID for the multi-access PDU session.

* * * * *